United States Patent
Yang et al.

(10) Patent No.: US 9,146,688 B2
(45) Date of Patent: Sep. 29, 2015

(54) ADVANCED GROOMER FOR STORAGE ARRAY

(71) Applicant: Fusion-io, Inc., Salt Lake City, UT (US)

(72) Inventors: Jingpei Yang, San Jose, CA (US); Ned D. Plasson, Salt Lake City, UT (US); Nisha Talagala, Livermore, CA (US); Dhananjoy Das, Salt Lake City, UT (US); Swaminathan Sundararaman, Santa Clara, CA (US)

(73) Assignee: SanDisk Technologies, Inc., Plano, TX (US)

( * ) Notice: Subject to any disclaimer, the term of this patent is extended or adjusted under 35 U.S.C. 154(b) by 314 days.

(21) Appl. No.: 13/758,824

(22) Filed: Feb. 4, 2013

(65) Prior Publication Data

US 2014/0156965 A1 Jun. 5, 2014

Related U.S. Application Data

(60) Provisional application No. 61/733,777, filed on Dec. 5, 2012.

(51) Int. Cl.
*G06F 3/06* (2006.01)
*G06F 12/02* (2006.01)

(52) U.S. Cl.
CPC ............ *G06F 3/064* (2013.01); *G06F 12/0253* (2013.01)

(58) Field of Classification Search
CPC .............................. G06F 3/064; G06F 12/0253
USPC ........................... 711/165, 154, 156; 707/813
See application file for complete search history.

(56) References Cited

U.S. PATENT DOCUMENTS

| | | | |
|---|---|---|---|
| 7,215,580 B2 | 5/2007 | Gorobets | |
| 7,328,307 B2 | 2/2008 | Hoogterp | |
| 7,444,461 B2 * | 10/2008 | Traister et al. | 711/103 |
| 7,451,265 B2 * | 11/2008 | Traister et al. | 711/103 |
| 8,281,154 B2 * | 10/2012 | Donie et al. | 713/190 |
| 8,438,361 B2 * | 5/2013 | Goss et al. | 711/170 |
| 8,452,911 B2 * | 5/2013 | Gorobets et al. | 711/5 |
| 8,458,417 B2 * | 6/2013 | Goss et al. | 711/159 |
| 8,543,758 B2 * | 9/2013 | Larson et al. | 711/103 |
| 8,832,371 B2 * | 9/2014 | Uehara et al. | 711/114 |
| 2009/0157989 A1 * | 6/2009 | Karamcheti et al. | 711/156 |
| 2011/0066808 A1 | 3/2011 | Flynn et al. | |
| 2011/0126045 A1 * | 5/2011 | Bennett | 714/6.22 |
| 2012/0030408 A1 | 2/2012 | Flynn et al. | |

* cited by examiner

*Primary Examiner* — Stephen Elmore
(74) *Attorney, Agent, or Firm* — Kunzler Law Group, PC

(57) ABSTRACT

Techniques are disclosed relating to reclaiming data on recording media. In one embodiment, an apparatus has a solid-state memory array including a plurality of blocks. The solid-state memory array may implement a cache for one or more storage devices. Respective operational effects are determined relating to reclaiming ones of the plurality of blocks. One of the plurality of blocks is selected as a candidate for reclamation based on the determined operational effects, and the selected block is reclaimed. In some embodiments, the determined operational effects for a given block indicate a number of write operations to be performed to reclaim the given block. In some embodiments, operational effects are determined based on criteria relating to assigned quality-of-service levels. In some embodiments, operational effects are determined based on information relating to virtual storage units.

25 Claims, 15 Drawing Sheets

Pseudo Code 900A

Initialization Portion 910
```
Set "oldest LEB window size"
Set max_vsu_flag_sum= MIN_VALUE
For each LEB within "oldest LEB window" do
```

Space Adjustment Portion 920
```
  Compute 'space efficiency'
    utilization = valid_pkts / total_pkts_per_leb
    space = (1 – utilization) * 10 / (1 + utilization)
```

Age Adjustment Portion 930
```
  Compute 'age'
    age = position_in_list * 10 / num_lebs_in_activelist
  Compute 'vsu_flag' for current LEB per VSU
```

Flag Portion 940A

$$vsu\_flag \mathrel{+}= \begin{cases} \dfrac{10}{\# \text{ of } VSUs} & (delta \geq valid\_pkts \text{ or } valid\_pkts = 0) \\[6pt] \dfrac{5}{\# \text{ of } VSUs} + \dfrac{delta*5}{valid\_pkts * \# \text{ of } VSUs} & (-valid\_pkts < delta < valid\_pkts) \\[6pt] 0 & (delta \leq -valid\_pkts) \end{cases}$$

Flag Sum Portion 950
```
  Compute sum of VSU flags for current_LEB: flag_sum
    flag_sum = space * w1 + age * w2 + (vsu_flag_0+...+vsu_flag_N) * w3
```

Comparison Portion 960
```
  if flag_sum > max_vsu_flag_sum
    max_vsu_flag_sum=flag_sum
    reclamation_leb = current_LEB
done
put to groomer queue
```

FIG. 9A

Pseudo Code 900B

Initialization Portion 910 { Set "oldest LEB window size"
Set max_vsu_flag_sum= MIN_VALUE
For each LEB within "oldest LEB window" do Space Adjustment Portion 920 { Compute 'space efficiency'
utilization = valid_pkts / total_pkts_per_leb
space = (1 – utilization) * 10 / (1 + utilization)

Age Adjustment Portion 930 { Compute 'age'
age = position_in_list * 10 / num_lebs_in_activelist
Compute 'vsu_flag' for current LEB per VSU
Read VSU related info per LEB from memory
valid_pkts = valid_pkts_per_VSU_in_LEB Flag Portion 940B 
$$vsu\_flag \mathrel{+}= \begin{cases} \dfrac{10}{\#\,of\,VSUs} & (delta \geq valid\_pkts\ or\ valid\_pkts = 0) \\ \dfrac{5}{\#\,of\,VSUs} + \dfrac{delta*5}{valid\_pkts * \#\,of\,VSUs} & (-valid\_pkts < delta < valid\_pkts) \\ 0 & (delta \leq -valid\_pkts) \end{cases}$$

Flag Sum Portion 950 { Compute sum of VSU flags for current_LEB: flag_sum
flag_sum = space * w1 + age * w2 + (vsu_flag_0 +...+ vsu_flag_N) * w3

Comparison Portion 960 { if flag_sum > max_vsu_flag_sum
max_vsu_flag_sum = flag_sum
reclamation_leb = current_LEB done
put to groomer queue

FIG. 9B

Table 1000A

|  | 1 | 2 | 3 | FLAG SUM |
|---|---|---|---|---|
| VSU ID | 1 | 2 | 3 |  |
| MIN Capacity | 10 | 0 | 10 |  |
| CURR USAGE | 15 | 10 | 30 |  |
| Delta | 5 | 10 | 20 |  |
| LEB 1 (10 Valid Pkts) | 2.5 | 3.33 | 3.33 | 9.16 |
| LEB 2 (20 Valid Pkts) | 2.08 | 2.5 | 3.33 | 7.91 |
| LEB 3 (0 Valid Pkts) | 3.33 | 3.33 | 3.33 | 9.99 |

FIG. 10A

Table 1000B

|  | 1 | 2 | 3 | FLAG SUM |
|---|---|---|---|---|
| VSU ID | 1 | 2 | 3 |  |
| MIN Capacity | 10 | 0 | 10 |  |
| CURR USAGE | 15 | 10 | 30 |  |
| Delta | 5 | 10 | 20 |  |
| (8 Valid Pkts for VSU1)<br>(0 Valid Pkts for VSU2)<br>(2 Valid Pkts for VSU3)<br>LEB 1 | 2.71 | 3.33 | 3.33 | 9.37 |
| (0 Valid Pkts for VSU1)<br>(15 Valid Pkts for VSU2)<br>(5 Valid Pkts for VSU3)<br>LEB 2 | 3.33 | 2.78 | 3.33 | 9.44 |
| LEB 3 (0 Valid Pkts) | 3.33 | 3.33 | 3.33 | 9.99 |

FIG. 10B

ADVANCED GROOMER FOR STORAGE ARRAY

The present application claims the benefit of U.S. Provisional Appl. No. 61/733,777 filed on Dec. 5, 2012, which is incorporated by reference herein in its entirety.

BACKGROUND

1. Technical Field

This disclosure relates generally to processing data arranged on a physical recording medium, and more specifically to reclaiming blocks of data for further use.

2. Description of the Related Art

Within a physical recording medium, blocks of data may be reclaimed for further use. For example, in the solid-state storage media context, a set of data is typically written to solid-state storage media by performing an erase operation on a group of cells followed by a program operation on those cells. Because of the small size of these cells and the high voltages used to perform these operations, the cells can only be erased and programmed a limited number of times before the transistors within the cells begin to degrade.

To improve the longevity of these cells, modern systems may arrange data on a recording medium using a log-structure to ensure that writes to cells are more evenly distributed across the medium to produce better wear leveling (as opposed to writing particular cells frequently while other cells go unused). When storing data using a log-structured format, data may be written at an append point that starts at an initial portion in the medium and advances forward in the log as writes are performed. Accordingly, when portions of data are updated, rather than overwriting those portions of the media with the updated data, the previously stored portions of the data may instead be invalidated as updated versions of the data are written to the append point in the medium. The cells storing the invalid data may eventually be erased in order to permit the cells to be programmed to store subsequent data.

In some instances, a system may execute a process that is responsible for identifying blocks of cells with invalid data and erasing those blocks. This process of reclaiming blocks of data for subsequent use is sometimes referred to as "garbage collection." In the solid-state storage context, reclamation may include identifying and erasing blocks of data.

SUMMARY

The present disclosure describes embodiments in which storage blocks are selected as candidates for reclamation based on one or more criteria.

In one embodiment, a method is disclosed. The method includes operating an apparatus having a solid-state memory array including a plurality of blocks. The solid-state memory array may implement a cache for one or more storage devices. The method includes determining respective operational effects relating to reclaiming ones of the plurality of blocks. The method further includes selecting one of the plurality of blocks as a candidate for reclamation based on the determined operational effects and reclaiming the selected block.

In another embodiment, an apparatus is disclosed. The apparatus includes a selection module configured to select one of a plurality of storage blocks based on information relating to virtual storage units having data within the plurality of storage blocks. The apparatus may be configured to organize the plurality of storage blocks as a log structure. The apparatus further includes a reclamation module configured to reclaim the selected storage block.

In still another embodiment, an apparatus is disclosed. The apparatus includes a scoring module configured to calculate respective scores for ones of a plurality of storage blocks in a first storage. At least a portion of the first storage may be configured as a cache for a second storage. The scoring module is configured to calculate the respective scores based on respective indications of valid data in the storage blocks. The apparatus further includes a comparison module configured to identify a storage block as a candidate for reclamation based on the calculated scores.

In yet another embodiment, a non-transitory computer readable storage medium having program instructions stored thereon is disclosed. The program instructions are executable by a computing system to cause the computing system to perform operations. The operations include identifying ones of a plurality of storage blocks as candidate storage blocks to be reclaimed. The identifying is based on one or more quality-of-service criteria. The operations further include reclaiming the identified candidate storage blocks.

In another embodiment, a method is disclosed. The method includes organizing a plurality of storage blocks within a first storage as a log structure such that a tail identifies one of the plurality of storage blocks as a current oldest storage block. The first storage is configured as a cache for a second storage. The method further includes selecting one of the plurality of storage blocks such that the selected storage block is younger than the current oldest storage block. The method further includes performing a reclamation of the selected storage block.

In still another embodiment, an apparatus is disclosed. The apparatus includes one or more processors and memory having program instructions stored therein. The program instructions are executable by the one or more processors to cause the apparatus to select one of a plurality of erase blocks based on respective storage allocations assigned to applications of a computing system, and to cause an erasure of the selected erase block.

BRIEF DESCRIPTION OF THE DRAWINGS

FIGS. 9A and 9B depict examples of pseudo code for identifying blocks of data for reclamation.

FIGS. 10A and 10B depict examples of computing flag scores.

Figure 1:
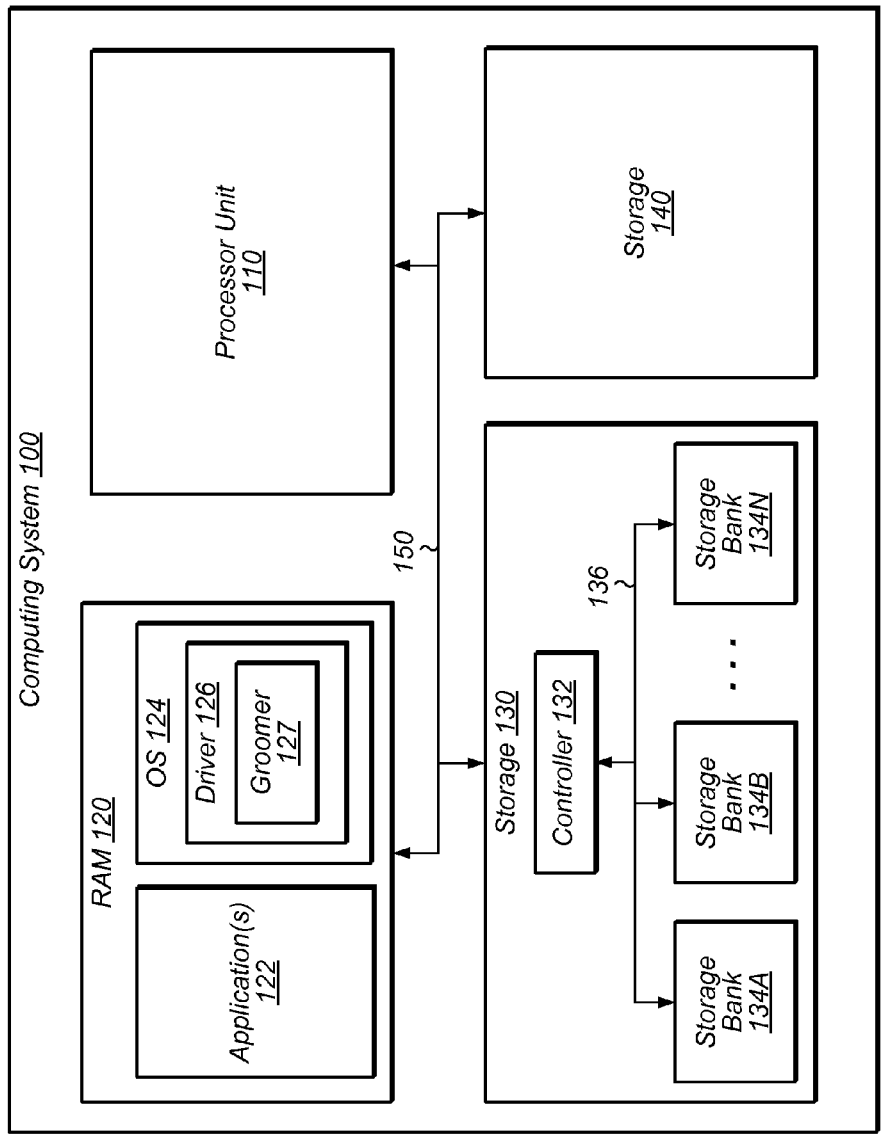
FIG. 1 is a block diagram illustrating one embodiment of a computing system including a memory array.

The disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

This disclosure also includes and references the accompanying drawings. In the drawings, similar symbols typically identify similar components, unless context dictates otherwise. The illustrative embodiments described in the detailed description, drawings, and claims are not meant to be limiting. Other embodiments may be utilized, and other changes may be made to these exemplary embodiments, without departing from the scope of the disclosure.

Various units, circuits, or other components in this disclosure may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component.

DETAILED DESCRIPTION

Figure 2:
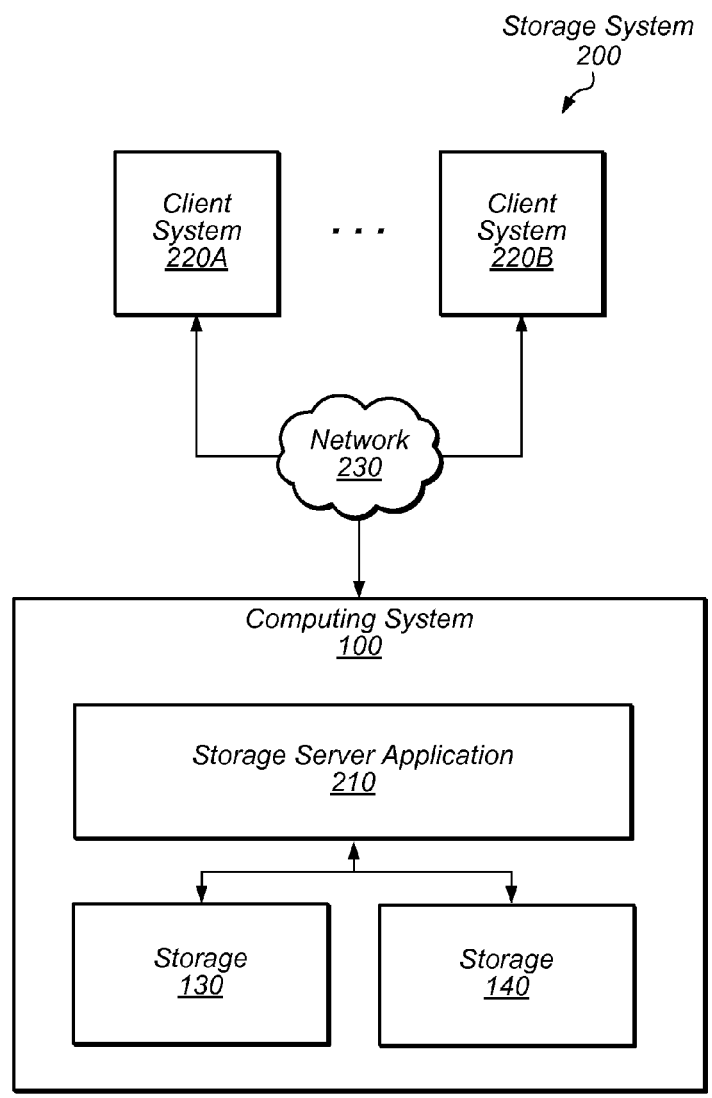
FIG. 2 is a block diagram illustrating one embodiment of a storage system that includes a memory array.

The disclosure initially describes, with reference to FIGS. 1 and 2, a computing system that executes a groomer in conjunction with a memory array. To facilitate this description, logical and physical address spaces used to implement one embodiment of a log-structured memory array are described with reference to FIGS. 3A-3C. Embodiments of the groomer are then described in further detail with reference to FIGS. 5-10B.

Turning now to FIG. 1, a block diagram of computing system 100 is depicted. Computing system 100 may be any suitable type of computing device such as a server, laptop, desktop, a mobile device, etc. In some embodiments, computing system 100 may include multiple computing devices working together. For example, in one embodiment, computer system 100 may be multiple servers coupled together at a data center configured to store data on behalf of multiple clients, such as the storage system discussed below in conjunction with FIG. 2. In the illustrated embodiment, computing system 100 includes a processor unit 110, random access memory (RAM) 120, storage 130, and storage 140 coupled together via an interconnect 150. As shown, RAM 120 may include program instructions for one or more applications 122 and an operating system (OS) 124 executable by processor unit 110. In the illustrated embodiment, OS 124 includes a driver 126, which further includes groomer 127.

In various embodiments, the functionality of groomer 127 may be implemented in software, hardware or a combination thereof. Further, such functionality may be implemented by software outside of OS 124—e.g., as an application 122, in one embodiment. In another embodiment, this functionality may be implemented by software stored within a memory of controller 132 and executed by a processor of controller 132. In still another embodiment, controller 132 may include dedicated circuitry to implement functionality of groomer 127. In sum, the depiction of groomer 127 as being implemented in software within OS 124 should not be seen as limiting, but rather as a depiction of an exemplary embodiment.

Storage 130 is representative of any physical medium upon which data can be recorded. As used herein, the term "recorded" refers broadly to the process of an electronic computing device storing, writing or otherwise transferring one or more data values on to some physical medium for subsequent use. Accordingly, a "physical recording medium" is used herein to refer to any medium on which data may be recorded by an electronic computing device. Further, the terms "storage" and "memory" are used herein to be synonymous with "physical recording medium." Given this broad definition, the designations storage 130 and storage 140 in FIG. 1 and elsewhere in this disclosure may refer to volatile and/or non-volatile media. Such media may also be referred to herein as "memory," and portions of such media may be referred to as "blocks," "cells," "storage blocks," "memory blocks," etc. Collectively, a group of these blocks may be referred to as a "storage array," "memory array," etc.

In some embodiments, storage 130 may be implemented such that it includes non-volatile memory. Accordingly, in such an embodiment, storage banks 130 may include non-volatile storage devices such as hard disk drives (e.g., Integrated Drive Electronics (IDE) drives, Small Computer System Interface (SCSI) drives, Serial Attached SCSI (SAS) drives, Serial AT Attachment (SATA) drives, etc.), tape drives, writable optical drives (e.g., CD drives, DVD drives, Blu-Ray drives, etc.) etc.

In some embodiments, storage 130 may be implemented such that it includes non-volatile solid-state memory. Accordingly, in such an embodiment, storage banks 130 may include any suitable type of solid-state storage media including, but not limited to, NAND flash memory, NOR flash memory, nano RAM ("NRAM"), magneto-resistive RAM ("MRAM"), phase change RAM ("PRAM"), Racetrack memory, Memristor memory, nanocrystal wire-based memory, silicon-oxide based sub-10 nanometer process memory, graphene memory, Silicon-Oxide-Nitride-Oxide-Silicon ("SONOS"), Resistive random-access memory ("RRAM"), programmable metallization cell ("PMC"), conductive-bridging RAM ("CBRAM"), etc. In some embodiments, storage banks 130 may include multiple, different types of solid-state storage media.

In other embodiments, storage 130 may be implemented such that it includes volatile memory. Storage banks 134 may thus correspond to any suitable volatile memory including, but not limited to such as RAM, dynamic RAM (DRAM), static RAM (SRAM), synchronous dynamic RAM (SDRAM), etc. Although shown independently of processor unit 110, in some embodiments, storage 130 may correspond to memory within processor unit 110 such as one or more cache levels (e.g., L1, L2, L3, etc.) within processor unit 110.

In sum, various functionality will be described herein pertaining to storage 130. Such functionality may be applicable to any suitable form of memory including both non-volatile and volatile forms. Thus, while particular embodiments of groomer 127 are described herein within the context of non-volatile solid-state memory arrays, groomer 127 may also be applicable to other recording media such as volatile memories and other types of non-volatile memories, particularly those that include a reclamation process.

Storage 140, in one embodiment, includes one or more storage devices. In some embodiments, memory within storage 140 may all be non-volatile such as the examples listed above; in other embodiments, storage 140 may include types of volatile memory such as those listed above. In some embodiments, storage 140 may correspond to network attached storage (NAS) or a storage area network (SAN) coupled to computing system 100 via a network. In some embodiments, storage 140 may store data in a similar manner as storage 130 including, for example, organizing data as a log structure. However, in other embodiments, storage 140 may organize data differently than storage 130.

In some embodiments, storage 130 may be configured to implement a cache for storage 140. (Such an implementation may be described as a "cache-device" implementation.) For example, in one embodiment, storage 140 may have slower access times than storage 130, but may have a higher storage capacity than storage 130. As data accesses are performed, data may be loaded into (i.e., cached in) storage 130 from storage 140. When subsequent data accesses are performed for data in storage 130, those accesses may experience lower latencies.

References in this disclosure to "accessing" data in storage 130 refers to any type of transaction, including writing data to storage 130 and/or reading data from storage 130, as well as, TRIM operations, maintenance accesses, discovery accesses, load and store operations under memory semantics, and the like. Further, given the broad definitions of "storage" and "memory" referred to above, these accesses may be applicable to a storage device that has non-volatile memory and/or volatile components.

Storage 130 may implement any suitable caching scheme. In one embodiment, storage 130 is configured as a write-through cache in which a write operation of data to storage 130 also causes a write operation of the data to storage 140 before completion of the write is acknowledged. In another embodiment, storage 130 is configured as a write-back cache in which data is written to storage 140 in conjunction with being evicted from storage 130. (As used herein, the term "destaging" refers to the writing of data to another storage. The term "eviction" refers to data being moved out of a cache (e.g., once the data is moved out of the cache the data may be marked invalid—a term defined below)). Data for which the most current, up-to-date, version is in the cache may be referred to as "dirty" data. Dirty data is destaged before the data is evicted.

In some embodiments, only a portion of storage 130 may be devoted to implementing a cache for storage 140 while other portions of storage 130 may be used to store non-cached data. For example, in one embodiment, storage 130 may store data of first and second "virtual storage units" (this concept is discussed below). In such an embodiment, storage 130 may store data for the first virtual storage unit as cached data while also storing data for the second virtual storage unit as non-cached data (i.e., storage 140 does not store data for the second virtual storage unit). (In such an embodiment, the first virtual storage unit may be described as a cache-type virtual storage unit; the second virtual storage unit may be described as a block-type virtual storage unit.) In some embodiments, storage 130 may also store data (cached or non-cached) that is not affiliated within any virtual storage unit.

In other embodiments, however, storage 130 may not be configured as a cache for storage 140. (Such an implementation may be described as a "block-IO-device" implementation.) In contrast to a cache-device implementation (discussed above), cache eviction does not occur in a block-IO-device implementation as storage 130 is not functioning as a cache. Still, in other embodiments, computing system 100 may not include storage 140. Various functionality of groomer 127 (described below) may be applicable to block-IO-device implementations as well as cache-device implementations.

In the illustrated embodiment, storage 130 includes a controller 132 coupled to banks 134 via an interconnect 136. Controller 132, in one embodiment, is configured to manage operation of solid-state storage 130. Accordingly, controller 132 may facilitate performance of read operations at specified addresses (e.g., "physical addresses" as discussed below) including selecting the appropriate banks 134 and accessing the data within the appropriate cells within those banks. Controller 132 may facilitate performance of write operations including programming of particular cells. Controller 132 may also perform preparation operations to permit subsequent writes to storage 130 such as, in one embodiment, erasing blocks of cells for subsequent reuse. (The cycle of programming and erasing a block of cells may be referred to as a "PE cycle.") In some embodiments, controller 132 implements separate read and write data pipelines to perform read and write operations in parallel. In one embodiment, controller 132 is also configured to communicate with driver 126 (discussed below) over interconnect 150. For example, in some embodiments, controller 132 communicates information for read and write operations via direct memory access (DMA) transactions coordinated by a DMA controller. Accordingly, controller 132 may support any suitable interconnect type such as a peripheral component interconnect (PCI), PCI express (PCI-e), serial advanced technology attachment ("serial ATA" or "SATA"), parallel ATA ("PATA"), small computer system interface ("SCSI"), IEEE 1394 ("FireWire"), Fiber Channel, universal serial bus ("USB"), etc. In some embodiments, controller 132 may also perform other operations such as error checking, data compression, encryption and decryption, packet assembly and disassembly, etc.

In various embodiments, solid-state memory array 130 (and storage 140, in some embodiments) is organized as a log-structured storage. As used herein, the term "log structure" refers to an arrangement of data on a storage medium in which an append point is used to determine where data is stored; the append point is advanced sequentially through an "address space" as data is stored. A log-structured memory array is simply a memory array that is organized using a log structure. The use of a log structure also connotes that metadata is stored in conjunction with the data in order to permit the storage 130 to be restored to a previous state (i.e., a "log checkpoint"). Such a restoration may be performed, for example, to facilitate crash recovery in the event of power loss, to recover a last known valid state in the event of data corruption, etc. As used herein, the term "address space" refers to a range of addresses that can be used to specify data within the memory array. As will be described below, a log-structured memory array may have both logical and physical address spaces. The term "logical address space" refers to an address space as perceived by higher-level processes even though this address space may not be representative of how data is actually organized on the physical media of storage 130 and/or 140. In contrast, the term "physical address space" refers to the address space used by lower-level processes and is indicative of how data is organized on the physical media of storage 130 and 140. Embodiments of logical and physical address spaces are discussed in further detail in conjunction with FIGS. 3A and 3B, respectively. One embodiment of a log structure is discussed in conjunction with FIG. 3C.

In various embodiments, using a log structure may permit multiple instances of a set of data to be present in storage 130 (and storage 140) as the data is written, modified, and rewritten to storage. As part of tracking data in a physical address space, older instances of stored data (i.e., those instances that are not the current instance) may be indicated as invalid. For example, in one embodiment, when a value is to be updated, the value may be written at a storage block specified by the current append point (rather than at the location where the value was previously stored). In response to the write being successfully performed, any previously stored instances of that value may be marked as invalid. As used herein, the term "invalid" refers to data that no longer needs to be stored by the system (e.g., because a newer copy of the data exists). Similarly, the term "invalidating" refers to the marking of data as invalid (e.g., storing a record in a data structure).

Applications 122, in one embodiment, operate on data that is written to and/or read from storages 130 and 140. In some instances, an application 122 may access data within storages 130 and 140 by specifying a corresponding file name to OS 124 via an application programming interface (API) request (in other instances, an application 122 may access data directly by specifying an address to be read from or written to). OS 124, in turn, may implement a file system. In some embodiments, this may include maintaining file system information (e.g., a set of modes, file allocation tables, etc.) corresponding to directories and files within the file system. In response to the receiving the request, OS 124 may access the file system information to determine one or more addresses where data for the file is stored. OS 124 may then convey these addresses to driver 126. In one embodiment, driver 126 may then retrieve the data from storage 130 or storage 140.

In some embodiments, application data of applications 122 may be organized into one or more partitions called "virtual storage units." As used herein, the term "virtual storage unit" or "VSU" refers to an allocated set of storage blocks (e.g., logical blocks) usable by one or more applications 122 to store application data. In some embodiments, VSUs may be implemented such they present a larger logical address space to applications 122 than the actual physical address space. As such, the total number of logical blocks allocated to VSUs may exceed the number of available storage blocks on the physical media. In order to make this allocation scheme work, VSUs may be managed such that a VSU using less of its allocation shares physical media space with a VSU using more of its allocation. In some embodiments, VSUs may also be used to facilitate caching of data. For example, when an application 122 stores data into a virtual storage unit, storage 130 may cache a portion of this data, or the data may reside in storage 140 without being currently cached in storage 130. In some embodiments, a VSU may also be configured to store data for another VSU. That is, an application 122 may write data to one VSU that, in turn, stores the data within another VSU. In such an embodiment, one VSU may also be configured as cache for another VSU. As will be discussed below, information relating to VSUs, in some embodiments, may be used to determine "write amplification effects" for reclaimed storage blocks having data associated with VSUs. VSUs are discussed in further detail with respect to FIG. 3A.

In some embodiments, different quality-of-service (QoS) levels may be afforded to storage blocks within storages 130 and/or 140. As used in the present disclosure, "quality of service" refers to some measurement relating to storage of data. For example, a quality of service might relate in some embodiments to an amount of a physical storage allocation for a particular application or VSUs, to a hit rate in a cache, a speed of access, etc. A quality of service "level" refers to some desired criteria or threshold associated with a particular quality.

For example, a QoS level, in certain embodiments, may specify a minimum or maximum value for a particular quality. Accordingly, different QoS levels may relate, for example, to different minimum capacities for storage allocations, specified levels of I/O bandwidth for storages 130 and/or 140, different priority levels for particular write and read operations, etc. In one embodiment in which storage 130 implements a cache, different QoS levels may include guaranteeing minimum (or maximum) storage-allocation capacities of the cache (this type of QoS level may be referred to below as Min QoS), guaranteeing particular hit rates, using different cache loading and/or eviction policies, etc. QoS levels may be assigned on any number of various bases. In one embodiment, QoS levels may be assigned on an application basis—e.g., particular applications 122 that have high I/O-latency dependence may be given a QoS level with a higher access priority than applications 122 having less I/O-latency dependence. In another embodiment, QoS levels may be assigned on a per-VSU basis. For example, in one embodiment, particular VSUs may be assigned different minimum storage allocations of the cache implemented by storage 130. In other embodiments, QoS levels may be assigned on a per-storage device basis. For example, write operations to a particular storage device may be given a higher QoS level than write operations to another storage device. In still other embodiments, QoS levels may be assigned based on the particular type of circuitry that is providing the data (e.g., different levels for I/O devices, peripheral devices, and network devices). In other embodiments, QoS levels may be assigned based on the types of data being stored. As will be discussed below, criteria relating to quality-of-service levels, in some embodiments, may be used to determine write amplification effects for reclaiming storage blocks.

Driver 126, in one embodiment, is executable to permit applications 122 and OS 124 to interact with storages 130 and 140. Accordingly, driver 126 may receive requests to perform read and write operations at specified addresses and may issue corresponding commands to controller 132 to implement those operations. In some embodiments, driver 126 also maps logical addresses (e.g., logical block addresses (LBAs)) to corresponding physical addresses (in other embodiments, mapping logical addresses to physical addresses may be performed elsewhere, such as at controller 132). In some embodiments in which storage 130 implements a cache for storage 140, driver 126 may manage the cache including loading data into the cache and evicting data from the cache. In some embodiments, driver 126 also manages garbage collection for storage 130 to reclaim storage blocks with invalid data. As used herein, "reclaiming" a storage block or "reclamation" of a storage block refers to preparing the storage block for reuse (i.e., so that the storage block can store new data). In the case of flash media, reclamation may include copying valid data out of the storage block and erasing the block. In the illustrated embodiment, driver 126 performs garbage collection via groomer 127. (As noted above, in other embodiments, garbage collection may be performed by processes other than those associated with driver 126; for example, in one embodiment, controller 132 executes instructions stored in a memory of controller 132 to perform garbage collection.)

Groomer 127, in one embodiment, is a set of processes executable to identify and reclaim storage blocks so that they can be subsequently used to store data. (As used herein, the phrase "set of processes" refers to a group of one or more processes; accordingly, groomer 127 may include a single process or multiple processes. As used herein, the term "process" refers generally to programs, threads, interrupt service routines, or other executable instances of program instructions.) Accordingly, in one embodiment, groomer 127 may be invoked when the number of available storage blocks in storage 130 falls below a specified threshold. At that point, groomer 127 may begin reclaiming storage blocks. In one embodiment in which storage 130 does not implement a cache, groomer 127 may reclaim a storage block by copying any valid data out of the storage block, invalidating the old version of data in the storage block, and instructing controller 132 to perform a preparation operation on the storage block (e.g., an erase operation in the case of flash media) to make the storage block available for subsequent use. In another embodiment in which storage 130 implements a cache, groomer 127 may reclaim a storage block by copying any valid data that cannot be evicted (for reasons discussed below) out of the storage block, evicting the remaining valid data, and instructing controller 132 to perform a preparation operation on the storage block. In one embodiment, groomer 127 may continue to reclaim storage blocks until the number of available blocks rises above the threshold.

In various embodiments, reclaiming storage blocks increases the amount of system-driven write operations performed to storage 130 as valid data within a storage block being reclaimed may need to be copied elsewhere in order to prevent the data from being lost during reclamation. This increase in system-driven write activity to manage storage 130 is commonly referred to as "write amplification." Write amplification is undesirable because it can reduce media longevity due to increased wear, reduce available bandwidth for application-driven I/O, increase system bus utilization, etc.

Thus, for a given storage block that is to be reclaimed, there may be some corresponding amount of write amplification associated with the reclamation. In one instance, there may be no write amplification for a given storage block. That is, a given storage block may include only invalid data as any previous valid data may have been invalidated as a result of an application 122 modifying the data, for example. Reclamation of a given storage block may also create no write amplification if it includes only evictable valid data and invalid data. For example, a storage block that stores data for one or more virtual storage units with a Min QoS of zero (i.e., those virtual storage units have no guaranteed storage capacity in the cache implemented by storage 130) may have only evictable valid—as discussed below, groomer 127 may select storage blocks for reclamation that maximize evictions in order to minimize write amplification. On the other hand, in another instance, a storage block may have a large amount of non-evictable valid data (e.g., due to the data being non-cached data or data that, upon eviction, would cause of a violation of one or more QoS criteria); accordingly, reclamation of this block will produce a corresponding amount of write activity within the storage. An indication of the amount of write amplification associated with reclaiming a given storage block is referred to herein as the "write amplification effects" for that block. In one embodiment, the write amplification effect for a given storage block may be a binary value indicative of whether or not there is associated write amplification. In another embodiment, the write amplification effect may be the number of write operations that would be performed to storage 130 in order to reclaim a storage block. In still another embodiment, the write amplification effect for a given storage block may be a score or other metric indicative of the extent of the write amplification for reclaiming the storage block. (As used herein, the term "score" refers to any suitable value in a computer-representable format, including an integer, floating-point number, percentage, fraction, etc.)

In various embodiments, groomer 127 may select storage blocks for reclamation based on their respective write amplification effects. (As used herein, the term "based on" is used to describe one or more factors that affect a determination. This term does not foreclose additional factors that may affect a determination. Thus, the phrase "determine A based on B" does not foreclose the determination of A from also being based on C.) For example, a first storage block may have a large amount (e.g., 80%) of valid data that would need to be rewritten in order to reclaim the block. A second storage block may have a smaller amount (e.g., 20%) of valid data that would need to be written in order to the reclaim the block As such, in one embodiment, groomer 127 may determine that the write amplification effect for reclaiming the first storage block is higher than those for reclaiming the second block. In such embodiment, groomer 127 may thus select the second block for reclamation before selecting the first block. By selecting the second block first, groomer 127 allows more time for conditions to change that would reduce the write amplification effects of reclaiming the first block. For example, application-driven I/O may invalidate data within the first storage block—thus reducing the write amplification effects for reclaiming the first storage block since this data would not need to be copied within the memory array. On the other hand, if the first block were reclaimed first and an application then modified the data that was in that block, two write operations would be performed rather than a single write operation. That is, a first write operation would be performed to copy the data out of the block for reclamation, and a second write operation would be performed in response to the data being modified.

As described above, groomer 127 may select storage blocks for reclamation based on write amplification effects for those storage blocks. Similarly, groomer 127 may select storage blocks for reclamation based on criteria relating to satisfying quality-of-service levels for storage blocks. In some embodiment, groomer 127 may select storage blocks for reclamation based on quality-of-service levels as attempting levels may produce write amplification. In other embodiments, however, groomer 127 may select storage blocks for reclamation independent of their write amplification effects. For example, in one embodiment in which storage 130 implements a cache, storage 130 may evict the entire contents of a storage block being reclaimed, rather than writing any data forward during reclamation. In such an embodiment, groomer 127 may select storage blocks for reclamation that attempt to maximize satisfying QoS levels. For example, if groomer 127 is selecting between two storage blocks for reclamation and both will produce at least some amount of QoS violations, groomer 127 may select the storage block that will produce either no QoS violations or the least amount of QoS violations. More generally, then, groomer 127 can be said to select storage blocks for reclamation based on "operational effects" associated with reclaiming a given storage block. As used herein, the term "operational effect," as applied to a given storage block, relates to at least one or more of a write amplification effect associated with that block, an effect relating to satisfying a quality-of-service level associated with that block, a change in the usable storage capacity of the storage 130, an IOPS (Input Output Operations Per Second) rate, a bandwidth rate, or the like.

As will be described in further detail below in conjunction with FIGS. 4 and 5, groomer 127 may use various criteria for determining the operational effects of reclaiming storage blocks. Accordingly, in various embodiments, groomer 127 may determine the operational effects by analyzing one or more characteristics attributable to write amplification. For example, in one embodiment, if groomer 127 determines that a given storage block has a particular characteristic attributable to write amplification, groomer 127 may set a binary value to indicate that reclaiming the storage block will produce write amplification. In another embodiment, groomer 127 may generate a score with a formula that uses one or more characteristics as weighted inputs. As discussed below, these factors may include, for example, amounts of valid data in storage blocks, various storage statistics (e.g., information relating to VSUs being stored), criteria relating to QoS levels, etc.

Turning now to FIG. 2, a block diagram of a storage system 200 including computing system 100 is depicted. As discussed above, computing system 100 may include one or more applications that operate on data stored in storage 130. In the illustrated embodiment, computing system 100 executes a storage server application 210 to enable client systems 220A and 220B to access and store data in solid-state storage 130 via network 230. For example, in one embodiment, storage system 200 may be associated within an enterprise environment in which server application 210 distributes enterprise data from storages 130 and 140 to clients 220. In some embodiments, clients 220 may execute other server applications such as web servers, mail servers, virtual private network (VPN) servers, etc. to further distribute data to other computing systems. Accordingly, in some embodiments, storage server application 210 may implement various network attached storage (NAS) protocols such as the file transfer protocol (FTP), network file system (NFS) protocol, server message block (SMB) protocol, Apple file protocol (AFP), etc. In some embodiments, computing system 100 may be one of several computing systems 100 configured to implement a storage area network (SAN).

Figure 3A:
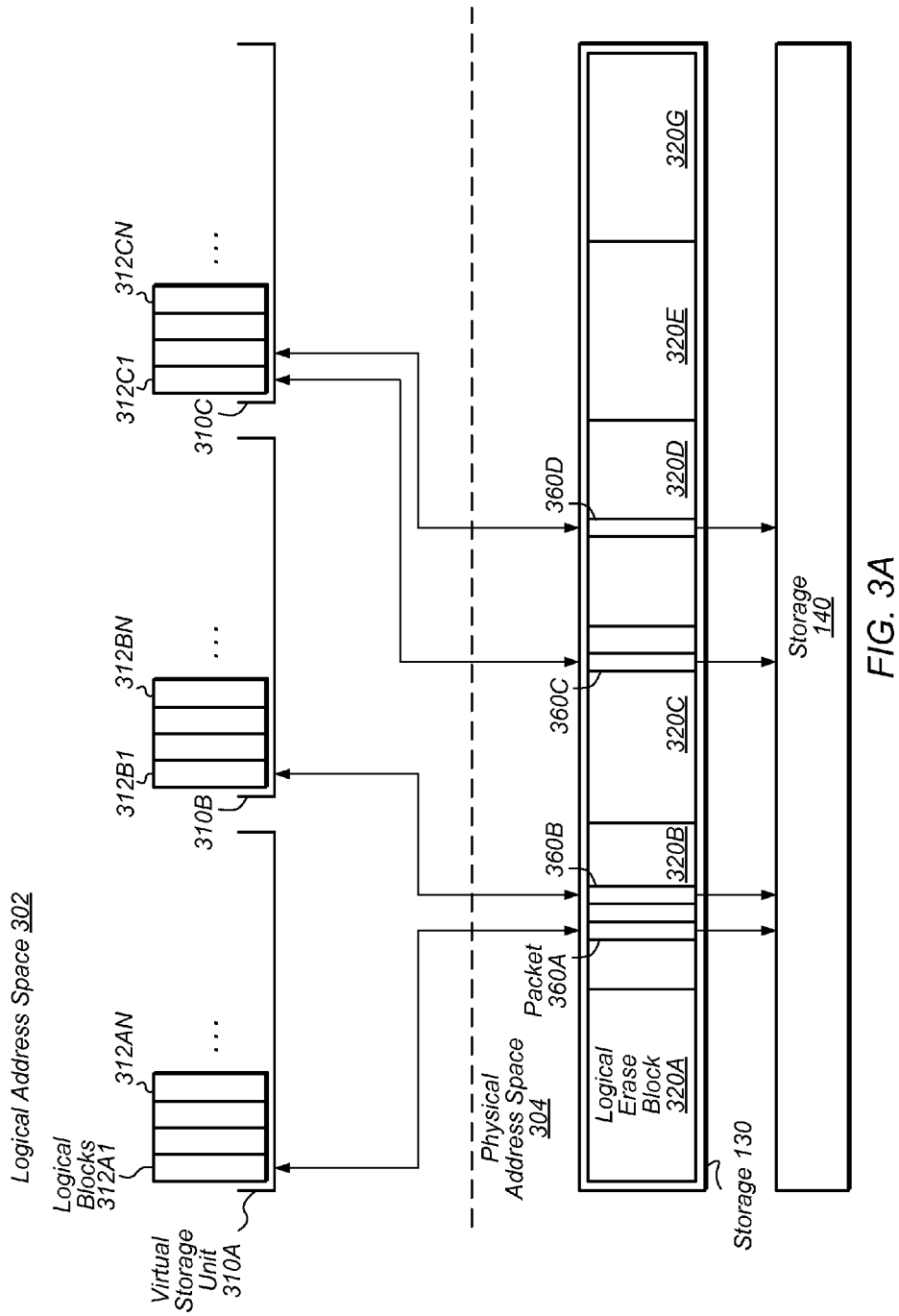
FIGS. 3A-3C are block diagrams illustrating embodiments of logical and physical address spaces.

Turning now to FIG. 3A, an exemplary mapping of a logical address space 302 to a physical address space 304 is depicted. In one embodiment, logical address space 302 represents the organization of data as perceived by higher-level processes such as applications 122 and OS 124. In one embodiment, physical address space 304 represents the organization of data on the physical media.

Logical address space 302, in one embodiment, is divided into logical addresses corresponding to respective logical blocks 312A1-312CN (also referred to as sectors 312). In some embodiments, the logical addresses are logical block addresses (LBAs) (in other embodiments, the logical addresses may correspond to some other form of logical identifiers). In one embodiment, sectors/blocks 312 represent the smallest block of data associated with a given logical address. As but one example, a block 312 may be approximately 512 bytes in size (while logical erase blocks and logical pages discussed below may be approximately 40 MB and 8 kB, respectively).

Physical address space 304, in one embodiment, is divided into physical addresses corresponding to the arrangement of data on the physical recoding media. As will be discussed in further detail with respect to FIG. 3B, in one embodiment, the content of logical blocks 312 may be stored as packets 360 within logical erase blocks 320. In one embodiment in which storage 130 implements a cache for storage 140, a corresponding packet 360 may also be written to storage 140 (e.g., upon writing a corresponding packet 360 to storage 130, in one embodiment, or upon evicting a packet from storage 130, in another embodiment). As discussed with respect to FIG. 3C, in various embodiments, physical address space 304 may be organized as a log structure, in which write operations may be performed at only one or more append points.

As shown, in some embodiments, logical blocks 312 may be allocated to a respective virtual storage unit 310 for storing data of that VSU 310. For example, in the illustrated embodiment, VSU 310A has been assigned a storage allocation of logical blocks 312A1-N, VSU 310B has been assigned an allocation of blocks 312B1-BN, and so on. As VSUs 310 store greater amounts of data, VSUs 310 consume more space within storages 130 and/or 140. In some embodiments, to prevent one VSU 310 from dominating consumption of storage 130, VSUs 310 may assigned to different quality-of-service levels that, for example, a guarantee respective minimum amount of storage 130 for a given VSU 310 such as discussed with respect to FIG. 5. For example, one VSU might be guaranteed a minimum storage allocation of 10 GB.

Figure 3B:
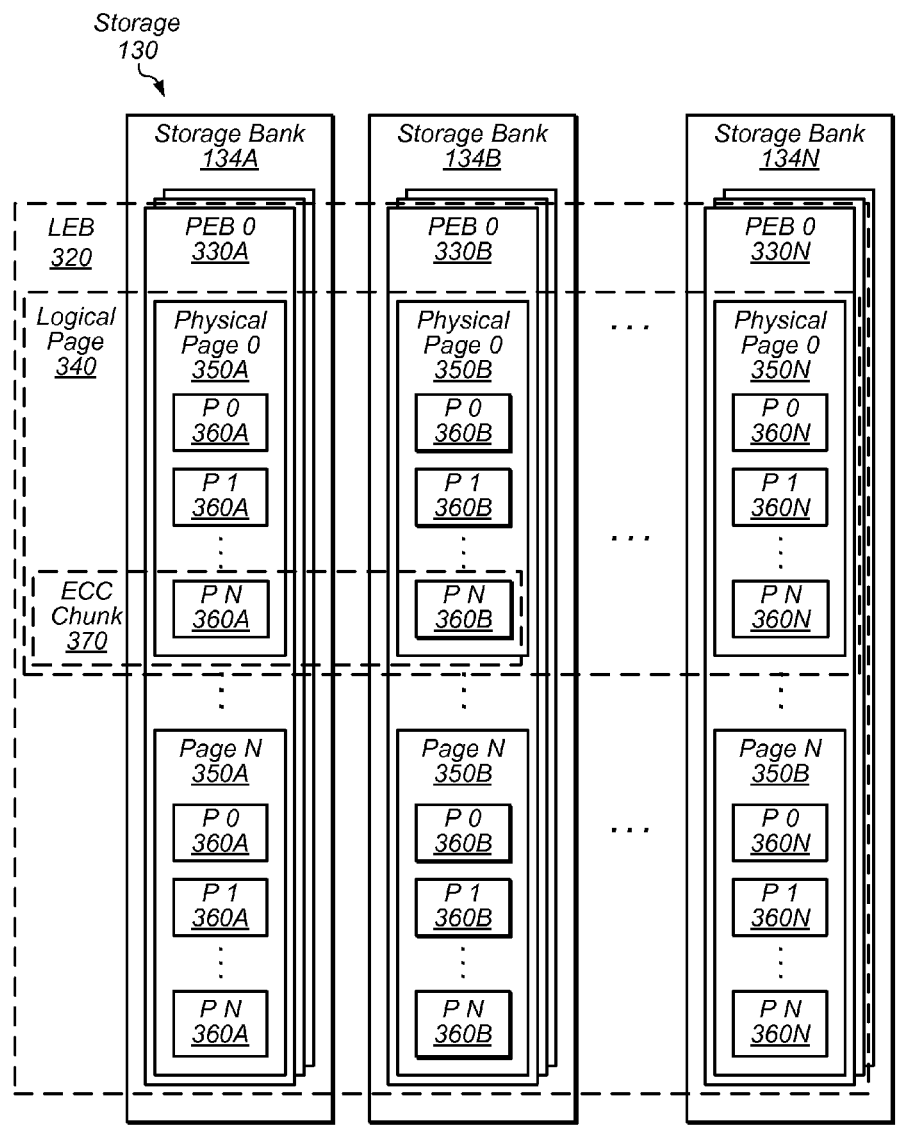

Turning now to FIG. 3B, a block diagram of storage blocks within memory array 130 is depicted. In the illustrated embodiment, memory array 130 is organized into logical erase blocks (LEBs) 320 that include multiple physical erase blocks (PEBs) 330, which are located in separate storage banks 134. A logical erase block 320 is further divided into multiple logical pages 340 that, in turn, include multiple physical pages 350. Pages 350 include multiple packets 360, which may be grouped into ECC chunks 370. (Embodiments of groomer 127 may operate on any suitable storage block including storage blocks at the logical level such as blocks 320, 340, and 370 and/or storage blocks at the physical level such as storage blocks 330, 350, and 360.)

As used herein, the term "erase block" refers broadly to a logical erase block or a physical erase block. In one embodiment, a physical erase block 330 represent the smallest storage block with a given bank 134 that can be erased at a given time (e.g., due to the wiring of cells on the die). In one embodiment, logical erase blocks 320 represent the smallest block erasable by controller 132 in response to receiving an erase command. In such an embodiment, when controller 132 receives an erase command specifying a particular logical erase block 320, controller 132 may erase each physical erase block 330 within the block 320 simultaneously. It is noted that physical erase blocks 330 within a given logical erase block 320 (e.g., blocks 330A and 330B) may be considered as contiguous in physical address space 304 even though they reside in separate banks 134. Thus, the term "contiguous" may be applicable not only to data stored within the same physical medium, but also to data stored within separate media.

As used herein, the term "page" refers broadly to logical pages or physical pages. In one embodiment, a physical page 350 represents the smallest storage block within a given bank 134 that can be written to at a given time. In one embodiment, a logical page 340 is the smallest writable storage block supported by controller 132. (In one embodiment, controller 132 may include a buffer configured to store up to a logical page worth of data; upon filling the buffer, controller 132 may write the contents of the buffer to a single logical page simultaneously.) In some instances, dividing a logical page 340 across multiple banks 134 may result in faster access times for a set of data when multiple banks 134 are accessed in parallel.

In one embodiment, a packet 360 represents the smallest storage block within a given bank 134 that can be read at a given time. In one embodiment, an ECC chunk 370 is the smallest storage block readable by controller 132. In some embodiments, packets 360 may be slightly larger than logical blocks 312 as they may include the contents of a logical block 312 (or multiple blocks 312 in some instances) as well as a packet header.

In some embodiments, driver 126 may associate metadata with one or more of storage blocks 320-370. As used herein, the term "metadata" refers to system data usable to facilitate operation of solid-state storage 130; metadata stands in contrast to, for example, data produced by applications 122 (i.e., "application data") or forms of data would be considered by OS 124 as "user data." For example, in one embodiment, a logical erase block 320 may include metadata specifying, without limitation, usage statistics (e.g., the number of program erase cycles performed on that block 320), health statistics (e.g., a value indicative of how often corrupted data has been read from that block 320), security or access control parameters, sequence information (e.g., a sequence indicator), a persistent metadata flag (e.g., indicating inclusion in an atomic storage operation), a transaction identifier, or the like. In some embodiments, a logical erase block 320 includes metadata identifying the VSUs 310 for which it stores packets as well as the respective numbers of stored packet for each VSU 310. In one embodiment, the header within a packet 360 may include packet metadata such as one or more LBAs associated with the contained data, the packet size, linkages to other packets, error correction checksums, etc. In various embodiments, driver 126 may use this information, along with other forms of metadata, to manage operation of storage 130. For example, driver 126 might use this information to facilitate performance of read and write operations, recover storage 130 to a previous state (including, for example, reconstruction of various data structures used by driver and/or replaying a sequence of storage operations performed on storage 130), etc.

Figure 3C:
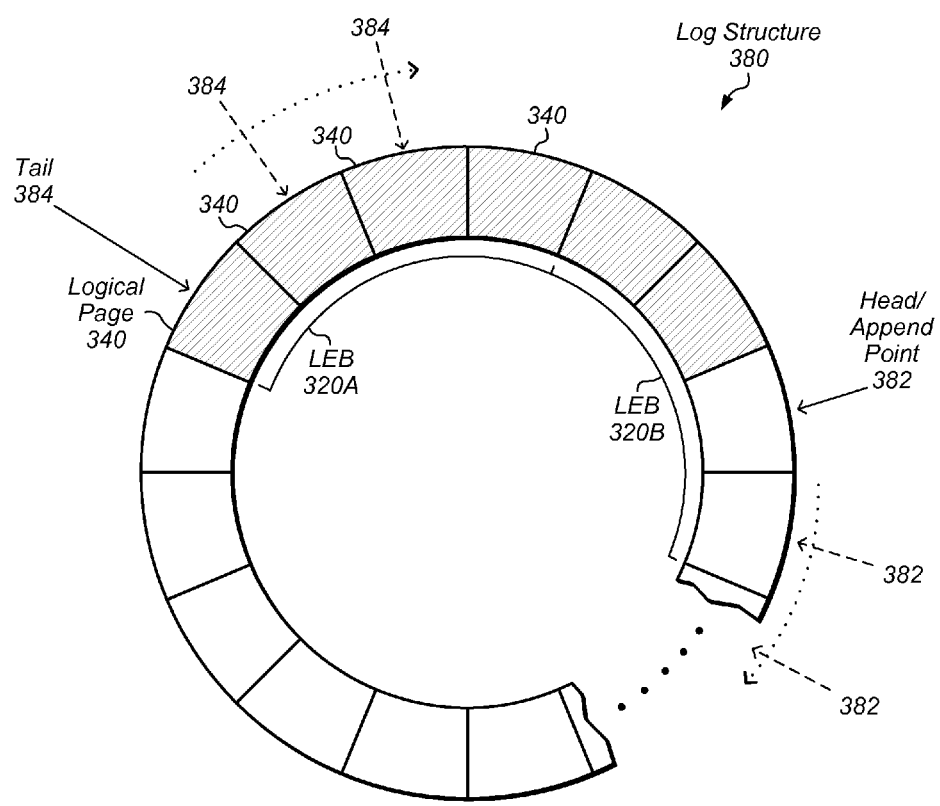

Turning now to FIG. 3C, a block diagram of log structure 380 within physical address space 304 is depicted. As shown, in various embodiments, data is stored sequentially at an append point 382 (also referred to as the "head") that starts an initial logical page 340. As additional data is stored, append point 382 advances to subsequent pages 340 in log structure 380. Eventually, after storing enough data, the append point 382 reaches the "last" page 340 in storage 130, at which point the append point 382 wraps back to the initial page 340. Thus, log structure 380 is depicted as a loop/cycle. As more data is stored, the number of available pages 340 (shown as unshaded pages 340) decreases and the number of used pages 340 (shown as shaded pages 340) increases. As discussed above, in order to reuse these pages 340 (i.e., make them available to receive further writes), in one embodiment, driver 126 (using groomer 127) performs erase operations on logical erase blocks 320. In one embodiment, a tail 384 is maintained to identify the oldest page 340 still in use within structure 380 (pages other than the one located at the tail are considered to be younger than the tail). When the logical erase block 320 with the oldest page 340 is eventually erased, tail 384 is advanced forward to the next oldest page 340 in use at the end of log structure 380.

In general, data that is modified less frequently than other data in storage 130 will migrate towards tail 384 (such data may be described as having a "colder temperature" or simply as "cold data"). On the other hand, data that is modified more frequently (described as having a "hotter temperature" or as "hot" data) will typically be located closer to head 382. Thus, valid data located in LEB 320A is likely "colder" than data in LEB 320B.

It is noted that, in other embodiments, storage 130 may organized in a non-log-structured format.

Figure 4:
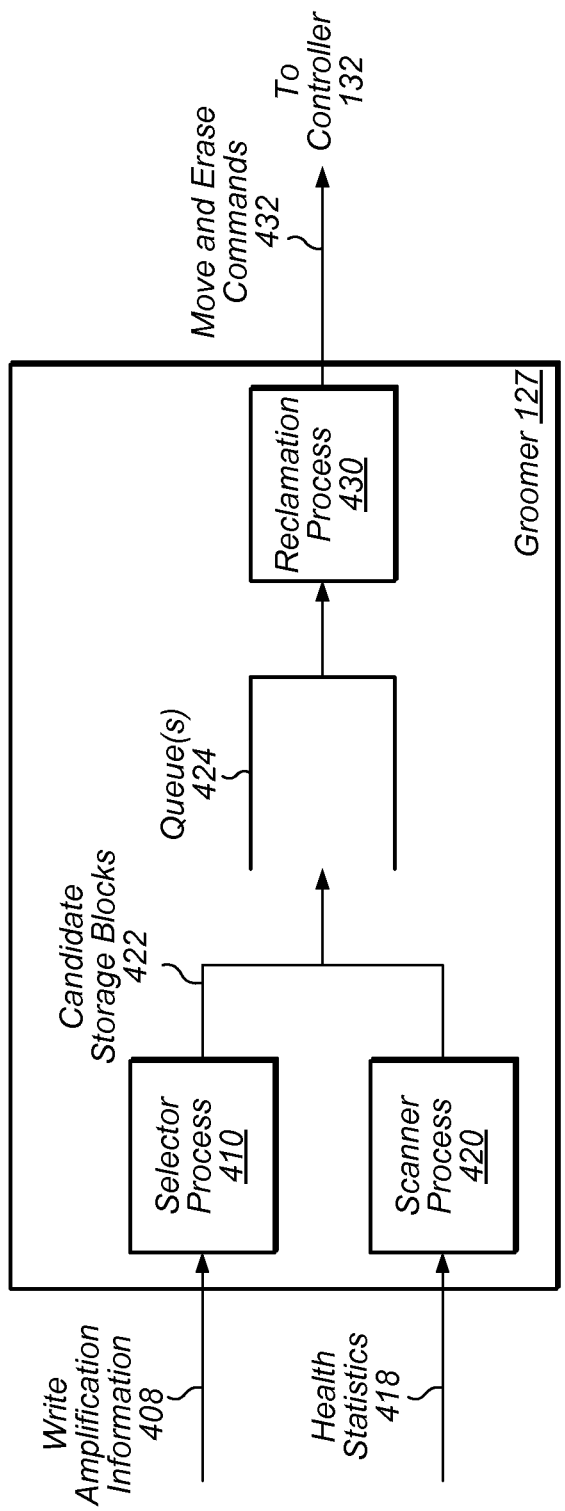
FIG. 4 is a block diagram illustrating one embodiment of a groomer.

Turning now to FIG. 4, a block diagram of one embodiment of groomer 127 is depicted. As noted above, in various embodiments, groomer 127 is executable to identify and reclaim storage blocks for garbage collection. In some embodiments, these storage blocks may correspond to logical erase blocks 320 (or, in other embodiments, these storage blocks may correspond to physical erase blocks 330). In the illustrated embodiment, groomer 127 includes a selector process 410, scanner process 420, and reclamation process 430. In some embodiments, the functionality of processes indicated by reference numerals 410, 420, and 430 may be performed by distinct processes; however, in other embodiments, a single process may implement this functionality.

Selector process 410, in one embodiment, identifies storage blocks 422 that are candidates for reclamation based on their write amplification effects as determined using write amplification information 408. As will be described in further detail with respect to FIG. 5, in various embodiments, process 410 uses write amplification information 408 to determine write amplification effects for storage blocks in storage 130, and then compares the determines write amplification effects to select storage blocks for reclamation. As discussed above, in some embodiments, determined write amplification effects may include a binary value (e.g., indicative of whether reclaiming a given block will produce write amplification), a score (e.g., indicative of an amount of write amplification that will result from reclaiming a given block), a value specifying the number write operations that will be performed in order to reclaim a block, etc. In some embodiments, selector process 410 may evaluate all storage blocks in storage 130 for possible reclamation. In other embodiments, selector process 410 may evaluate only a subset of the storage blocks in storage 130. Accordingly, in one embodiment, selector process 410 may evaluate storage blocks within a specified window of storage blocks measured from tail 384 towards head 382. For example, if tail 384 is pointing at logical erase block 320A and the specified window is four logical erase blocks 320, select process 410 may evaluate logical erase blocks 320A-D, but not logical erase block 320E.

Scanner process 420, in one embodiment, identifies storage blocks 422 that are candidates for reclamation based on the amount of corrupted (i.e., erroneous) data detected when data is read from those blocks. In the illustrated embodiment, process 420 determines this information based on one or more health statistics 418. In some embodiments, process 420 may select storage blocks known to have exhibited errors above some permissible threshold, or storage blocks that have sat idle for an extended period of time (e.g., have a retention time that exceeds a threshold associated with data integrity degradation) in order to periodically refresh the data in those blocks (assuming the erase blocks are not problematic to the point of not being usable). In some embodiments, process 420 may select storage blocks in order to remove those blocks from service.

In the illustrated embodiment, indications of identified candidate storage blocks 422 are stored in one or more queues 424 until those blocks can be serviced by reclamation process 430. In some embodiments, queues 424 may include queues associated with different priorities (e.g., a high-priority queue and a low-priority queue). In some embodiments, candidate storage blocks 422 may be provided directly to reclamation process 430.

Reclamation process 430, in one embodiment, reclaims storage blocks 422 identified by processes 410 and 420. Accordingly, in one embodiment in which storage 130 does not implement a cache, process 430 may reclaim a storage block by issuing corresponding commands to copy any valid data out of the storage block, invalidate the old version of data within that block, and perform a "preparation operation" on the storage block to make the storage block available for subsequent use. In the case of flash media, a preparation operation may be an erase operation. In another embodiment in which storage 130 acts as a cache, process 430 may reclaim a storage block by issuing one or more commands 432 to copy any valid data that cannot be evicted (e.g., for reasons discussed below) out of the storage block, evict the remaining valid data (if storage 130 is implementing a write-back cache), and perform a preparation operation on the storage block.

Figure 5:
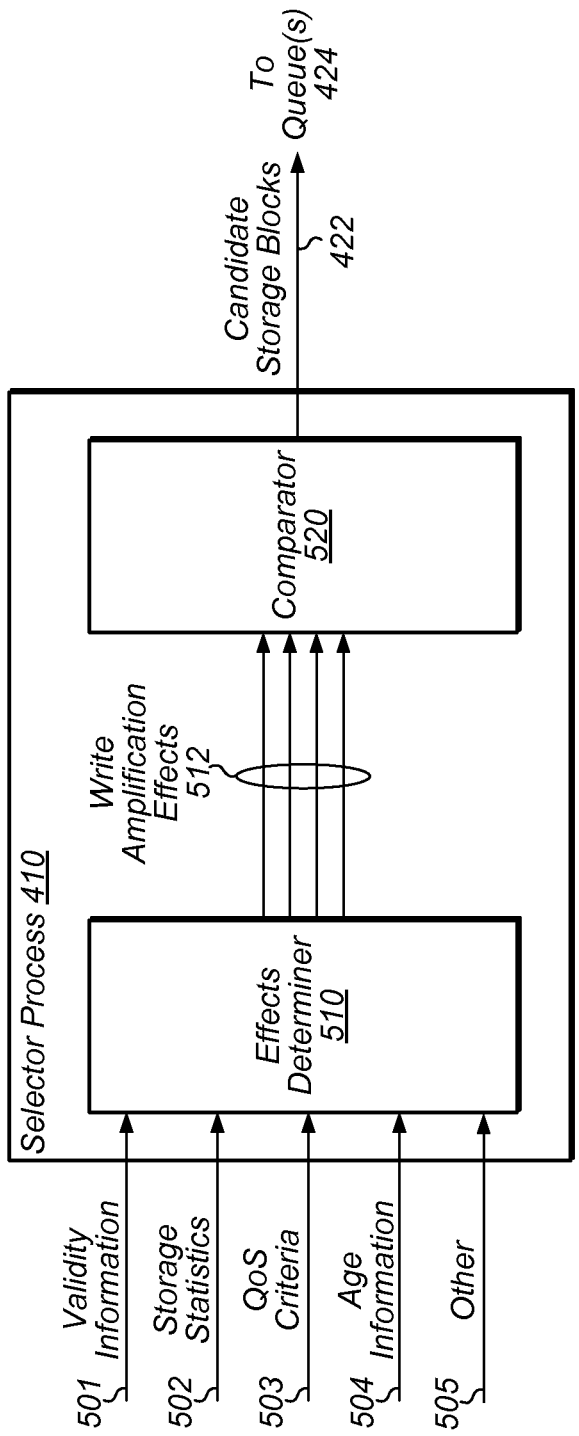
FIG. 5 is a diagram illustrating one embodiment of a selector process within the groomer.

Turning now to FIG. 5, a diagram of the functionality of selector process 410 is depicted. As noted above, in various embodiments, selector process 410 is responsible for identifying storage blocks for reclamation based on their respective write amplification effects. In the illustrated embodiment, process 410 includes an effects determiner 510 and a comparator 520. In other embodiments, selector process 410 may be organized differently.

In the embodiment shown, selector process 410 is implemented within a groomer such as groomer 127. As indicated above, groomer 127 may be implemented in hardware, software, or a combination thereof. Accordingly, in various embodiments, determiner 510 and comparator 520 may be considered as "modules," as that term is described below with reference to FIG. 6C.

Effects determiner 510, in one embodiment, determines write amplification effects 512 for reclaiming storage blocks of storage 130. As discussed above, determined write amplification effects 512 may be indicated in a variety of ways. In one embodiment, determiner 510 may indicate an effect 512 for a storage block with a binary (i.e., boolean) value. For example, the value may be set for a storage block if the block will produce at least some write amplification during reclamation; conversely, the value may not be set if the block will not produce any write amplification. In another embodiment, determiner 510 may indicate an effect 512 for a storage block with a score. For example, a higher score may be assigned to a storage block indicating that it is a better candidate for reclamation if the storage block will produce a lesser amount of write amplification upon reclamation. Conversely, a lower score may be assigned to a storage block that will produce a higher amount of write amplification. In still another embodiment, effect 512 may indicate the actual number of write operations that will be performed to reclaim the storage block. For example, an effect 512 may specify the number five for a storage block if reclaiming the storage block will generate five write operations to storage 130.

In the illustrated embodiment, determiner 510 determines effects 512 based on information 501-505. For example, in one embodiment in which an effect 512 is a binary value, determiner 510 may set the value if it determines that a storage block has one or more factors that will cause write amplification as indicated by information 501-505. In another embodiment in which an effect 512 is a score, determiner 510 may determine the score using at least some of its information as inputs to a formula for generating the score. In some embodiments (discussed below with respect to FIG. 7), determiner 510 may compute multiple partial scores based on different factors such that the multiple partial scores are combined together to produce a final score (i.e., total score) for the storage block. In still another embodiment in which an effect 512 is the number of write operations, determiner 510 may determine the number based on information 501-505.

Validity information 501, in one embodiment, is information that indicates the respective amounts of valid data within storage blocks. As discussed above, in various embodiments, the amount of valid data within a storage block is a contributing factor to write amplification as the data must be written elsewhere (e.g., back to storage 130 or to storage 140) in order to preserve it from reclamation. Information 501 may use any quantifier to specify an amount of valid data in a storage block. For example, in one embodiment, information 501 expresses an amount of valid data in terms of valid packets (e.g., packets 360) within a storage block. In some embodiments, this amount may be a total amount of valid packets within a storage block (as discussed with respect to FIG. 10A). In another embodiment, information 501 may specify the number of valid packets within the storage block for each VSU having data in the storage block (as discussed with respect to FIG. 10B). In some embodiments, determiner 510 may determine this information from multiple sources. For example, in one embodiment, determiner 510 may determine the number of valid packets within a given storage block by accessing statistics maintained by driver 126; determiner 510 may further determine the association of those packets to VSUs by accessing metadata stored within a portion of the storage block (e.g., the footer of a logical erase block 320).

Storage statistics 502, in one embodiment, are statistics about data being stored in storage 130. In some embodiments, storage statics 502 may be relevant to determining whether a storage block would produce write amplification if storage 130 is attempting to satisfy various storage criteria (such as QoS criteria 503) that may necessitate performing additional operations in some circumstances in order to satisfy those criteria. In one embodiment, statistics 502 include usage information such as the current used capacity of storage 130, the amount of remaining capacity in storage 130, the current I/O demand on storage 130 (e.g., indicative of I/O throughput), whether portions of storage 130 have been allocated, the sizes of those allocations, the current usages of those allocations, etc. In one embodiment in which storage 130 implements a cache, statistics 502 may include hit rates for the cache, information about the data loaded into the cache, information relating to load and/or eviction policies, etc. In some embodiments, statistics 502 may include VSU specific information such as amounts of storage 130 allocated to VSUs, each VSU's current usage of its storage allocation, the current cache-hit rates for each VSU, etc.

QoS criteria 503, in one embodiment, are criteria that storage 130 attempts to satisfy in order to achieve one or more afforded QoS levels. As discussed with respect to FIG. 1, QoS levels may be assigned on any of several bases such as on a VSU basis, application basis, storage device basis, etc. QoS levels may specify that an entity (e.g., VSU) be given a particular capacity storage allocation, a particular amount of I/O bandwidth for storages 130 and/or 140, a particular priority levels for its write and read operations, etc. In some embodiments, additional write operations may need to be performed in order to satisfy QoS criteria. Accordingly, in one embodiment, storage 130 may assign a QoS level to a VSU that guarantees that storage 130 will maintain a minimum amount of data for that VSU in storage 130 (this type of QoS may be referred to herein as a "minimum quality of service" or "Min QoS"). Retaining a Min QoS for a VSU, that is operating as a cache, may be advantageous provided the Min QoS is at least as large as the working set for the cache. In this manner, the working set remains in the cache and a desired cache hit rate can be maintained. For example, storage 130 may guarantee that it will cache up to a gigabyte (1 GB) of data (or some other amount of data) for a particular VSU. If that VSU currently has two gigabytes (2 GB) of data stored in storage 130 and a storage block that is being evaluated for reclamation also includes 10 MB data for that VSU, that data can be evicted from storage 130 (that is, rather than being written elsewhere in storage 130) without violating the Min QoS for that VSU. Evicting that data would result in that VSU still having 1.99 GB in storage 130—above the 1 GB minimum allocation. On the other hand, if that VSU currently has only one gigabyte (1 GB) of data stored in storage 130, an eviction of 10 MB would result in a violation of Min QoS as the VSU would have 0.99 GB in storage 130. To prevent reclamation of the storage block from causing a Min QoS violation, this data would need to be written elsewhere within storage 130, such that the VSU has at least one gigabyte of data in storage 130. Min QoS is discussed in further detail with respect to FIGS. 8-10.

Age information 504, in one embodiment, is information indicative of a storage block's age. A storage block's age may be assessed according to various criteria. As discussed above, in one embodiment, an age of storage block may be assessed by its proximity to tail 384, where the storage block identified by tail 384 is the oldest storage block. In another embodiment, the age of a storage block may be assessed based on when data was first written to a storage block. For example, storage block's age may be expressed as an amount of time (e.g., a number of clock cycles, seconds, minutes, etc.) since the block was initially written to. In still another embodiment, a storage block's age is assessed by the number of times that block has been evaluated as a candidate for reclamation without being selected. For example, a block being evaluated for the first time may have an age of zero. If it is not selected the next time, it may have an age of 1, and so on.

Although age information 504 for a storage block does not itself relate to write amplification, this information is an example of information that may be used to adjust a value indicative of write amplification effects for a given storage block. Thus, in various embodiments, the write amplification effects 512 for a given block may be adjusted as a function of that block's age. For example, in one embodiment, determiner 510 may give a particular block a more favorable score for reclamation if the block is an older block (i.e., the block has not been picked recently). In doing so, determiner 510 may guarantee that older blocks are eventually selected even if their reclamation would produce a high degree of write amplification. Accordingly, while determiner 510 may select candidate blocks based on their determined write amplification effects and other adjustment factors. Stated another way, a determiner 510 that selects blocks based on write amplification effects is not foreclosed from selecting blocks based in part on reasons not related to write amplification.

Other 505 is representative of various other factors that may be used to determine write amplification 512 as information 501-504 should not be seen as limiting, but rather as a depiction of an exemplary embodiment.

Comparator 520, in one embodiment, compares write amplification effects 512 and selects storage blocks 422 based on the comparison. In one embodiment, comparator 520 selects blocks that will produce the least amount of write amplification before selecting storage blocks that will greater produce amounts of write amplification. In one embodiment in which effects 512 are indicated as binary values, comparator 520 may select blocks having values indicating some amount of write amplification before selecting blocks having values that indicate no write amplification. In another embodiment in which effects 512 are score values, comparator 520 may select blocks that have more favorable scores for reclamation (e.g., blocks with the highest scores) before selecting blocks with less favorable scores. In still another embodiment in which effects 512 are indicated as the number of additional write operations, comparator 520 may select blocks having that will produce the least number of write operations during reclamation before selecting other blocks.

Figures 6A, 6B:
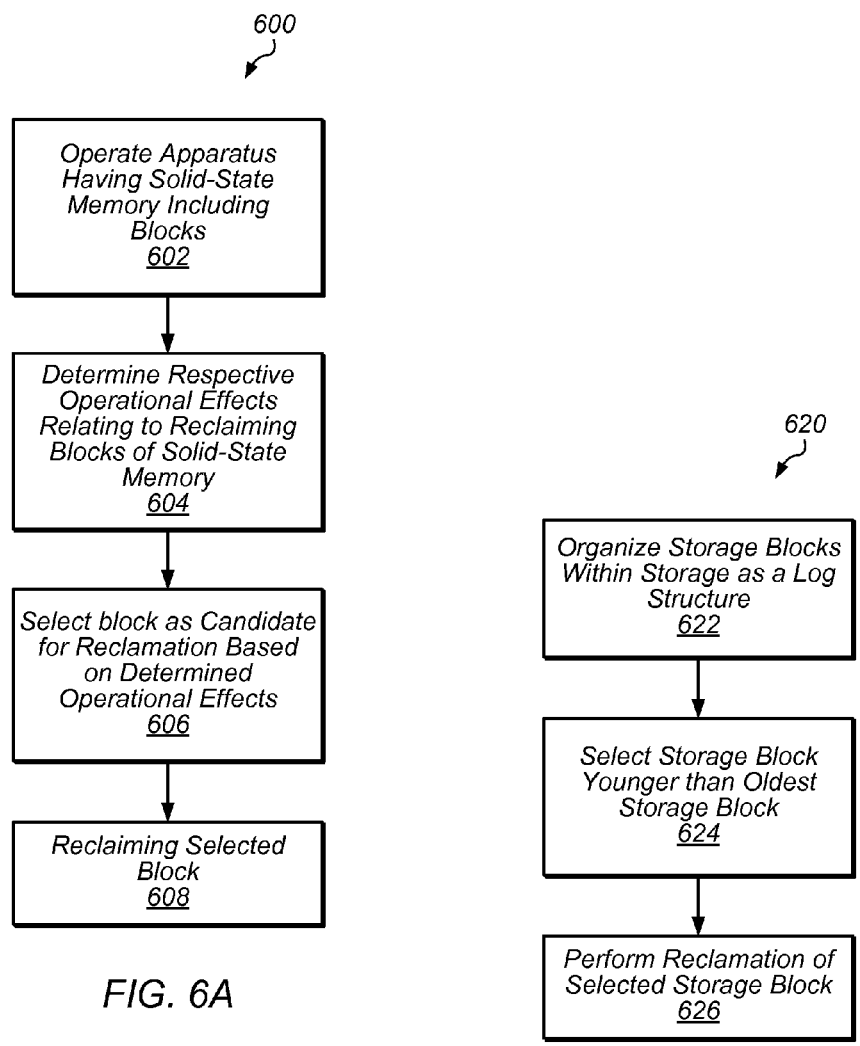
FIGS. 6A and 6B are flow diagrams illustrating embodiments of a method that may be performed by memory array or a computing system with a memory array.

Turning now to FIG. 6A, a flow diagram of a method 600 is depicted. Method 600 is one embodiment of a method that may be performed by an apparatus such as computing system 100 or storage 130. In some embodiments, performance of method 600 may reduce write amplification for a solid-state storage device of the apparatus.

In step 602, an apparatus having a solid-state memory array (e.g., storage 130) including a plurality of blocks (e.g., logical erase blocks 320, in one embodiment; physical erase blocks 330, in another embodiment) is operated. In one embodiment, the solid-state memory array implements a cache for one or more storage devices (e.g., storage devices included in storage 140). In some embodiments, step 602 may include assigning a quality-of-service level associated with the solid-state memory array. In some embodiments, step 602 may include maintaining a plurality of virtual storage units (e.g., VSUs 310) having data within the solid-state memory array.

In step 604, respective operational effects (e.g., write amplification effects 512) are determined (e.g., by determiner 510) relating to reclaiming ones of the plurality of blocks. In some embodiments, the determined operational effects for a given block indicate a number of write operations to be performed to reclaim the given block. For example, in one embodiment, the determining includes determining, for the given block, a score indicative of the number of write operations. In some embodiments, the operational effects are determined base on guaranteed capacities (e.g., Min QoS discussed with respect to FIG. 8A) for storage allocations within the solid-state memory array. In some embodiments, the determining includes determining criteria relating to one or more of the quality-of-service levels. In some embodiments, the determining includes determining a respective amount of valid data within the storage block for each virtual storage unit. Step 604 may also include performing various other techniques for determining operational effects such as those described above.

In step 606, one of the plurality of storage blocks is selected (e.g., by comparator 520) as a candidate for reclamation based on the determined operational effects. In one embodiment, the selecting includes selecting a storage block based on scores determined for ones of the plurality of storage blocks. In such an embodiment, the selecting is performed to minimize write amplification resulting from the reclaiming. In some embodiments, the selecting is based on the QoS criteria determined in step 604. In some embodiments, the selecting is based on the amounts of valid data determined in step 604. In one embodiment, the selecting is based on a number of times that the storage block has been evaluated as a candidate for reclamation without being selected.

In step 608, the selected storage block is reclaimed. As discussed above, in some embodiments, step 608 may include copying valid data out of the storage block, evicting remaining valid data (if the storage implements a write-back cache), and performing a preparation operation on the storage block (e.g., erasing the block).

Turning now to FIG. 6B, a flow diagram of a method 620 is depicted. Method 620 is one embodiment of a method that may be performed by an apparatus such as computing system 100 or storage 130. Method 620 begins in step 622 with organizing a plurality of storage blocks (e.g., logical erase blocks 320) within a first storage (e.g., storage 130) as a log structure (e.g., log structure 380) such that a tail (e.g., tail 384) identifies one of the plurality of storage as a current oldest storage block. In such embodiment, the first storage may be configured as a cache for a second storage (e.g., storage 140). Method 620 continues in step 624 with selecting one of the plurality of storage blocks such that the selected storage block is younger than the oldest storage block. In one embodiment, the selecting includes determining a score (e.g., an effect 512) for the storage block based on an amount of valid packets (e.g., packets 360) within the storage block that are to be rewritten to the first storage in response to reclaiming the storage block. In some embodiments, the selecting includes adjusting the score based on a number of times that the storage block has been evaluated for selection without being selected (e.g., as indicated by age information 504). In some embodiments, the score is determined based on one or more criteria relating to quality-of-service levels (as indicated by QoS criteria 503) associated with applications (e.g., applications 122) using the first storage. Method 620 continues in step 624, by performing a reclamation of the selected storage block. In some embodiments, steps 622-626 may be performed in a different order and/or concurrently.

Figure 6C:
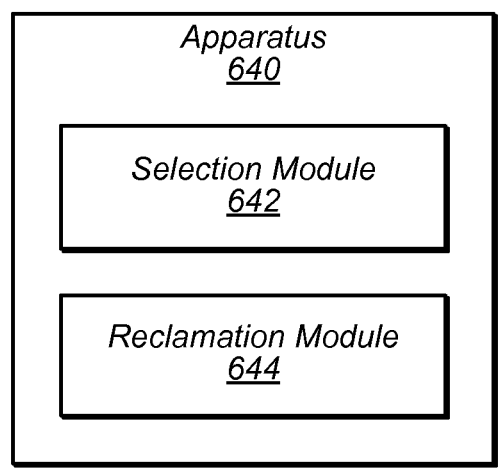
FIG. 6C is a block diagram illustrating one embodiment of an apparatus including modules.

Turning now to FIG. 6C, a block diagram of an apparatus 640 including modules is depicted. As used herein, the term "module" refers to circuitry configured to perform operations or a memory having program instructions stored therein that are executable by one or more processors to perform operations. Accordingly, a module may be implemented as a hardware circuit implemented in a variety of ways. The hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations. Apparatus 640 may include modules to implement any of the functionality described herein. For example, in the illustrated embodiment, apparatus 640 includes a selection module 642 configured to select one of a plurality of storage blocks based on information relating to virtual storage units having data within the plurality of storage blocks. Apparatus 640 further includes a reclamation module 644 configured to reclaim the selected storage block. In some embodiments, the selection module 642 and the reclamation module 644 are within controller 132. In another embodiment, modules 642 and 644 may be located within a memory such as memory 120. In sum, the modules of apparatus 640 may be implemented in any suitable manner to perform functionality described herein. Apparatus 640 may also correspond to any suitable structure having the functionality of modules 642 and 644. In one embodiment, apparatus 640 is a computing system that includes (or is coupled to) a storage such as storage 130. In another embodiment, apparatus 640 is a card including a controller (such as controller 132) and one or more storage elements (such as storage banks 134). In yet another embodiment, apparatus 640 is a computing system including a memory system that stores modules 642 and 644.

Figure 7:
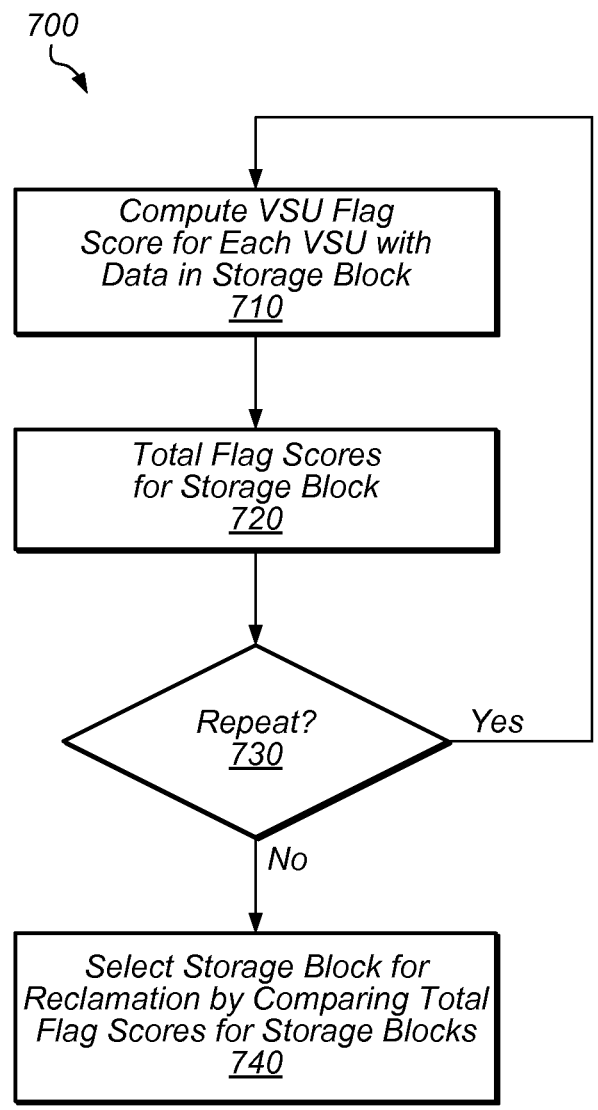
FIG. 7 is a flow diagram illustrating one embodiment of a method for identifying blocks of data for reclamation.

Turning now to FIG. 7, a flow diagram of a method 700 is depicted. Method 700 is one embodiment of a method for identifying storage blocks for reclamation. It is noted that method 700 should not be seen as limiting, but rather as a depiction of an exemplary embodiment. Accordingly, in other embodiments, storage blocks may be identified for reclamation in a different manner. In one embodiment, method 700 may be performed by an apparatus such as computing system 100 or storage 130.

In step 710, a VSU flag score is computed for each VSU with data in a given storage block. As used herein, a flag score refers to a score indicative of the write amplification effects associated with a particular VSU having data in a storage block being reclaimed. A flag score may be computed in variety of ways. For example, one embodiment of a method for computing a flag score (method 800A) is discussed with respect to FIG. 8A. Another embodiment of a method for computing a flag score (method 800B) is discussed with respect to FIG. 8B.

In step 720, each flag score computed in step 710 for the storage block is totaled to produce a total score referred to herein as a "flag sum" for a storage block. Accordingly, if three flag scores were calculated in step 710 for three VSUs having data within a storage block, the flag sum for that storage block would be the total of the three flag scores. In some embodiments, step 720 may further include adjusting the flag sum of a storage block by a space efficiency factor and/or an age factor determined based on, for example, storage statistics 502 and age information 504 discussed above with respect to FIG. 5. An example of how such factors may be calculated is discussed with respect to FIGS. 9A and 9B. In one embodiment, the flag sum may be adjusted by applying weight values (e.g., the values w1, w2, and w3 shown in FIGS. 9A and 9B) to the space efficiency factor, the age factor, and the flag sum, and then summing those values.

In various embodiments, steps 710 and 720 may be repeated to compute flag sums for additional storage blocks evaluated by method 700 as indicated by determination 730. In one embodiment, method 700 may include repeating steps 710 and 720 for each storage block within a defined window of storage blocks as discussed above. In another embodiment, steps 710 and 720 may be repeated for each storage block within storage 130.

In step 740, a storage block is identified for eviction by comparing the total flag scores for multiple storage blocks. In one embodiment, step 740 selects the storage block with most favorable score (e.g., the highest score in one embodiment) based on the block's write amplification effects and current age. Of course, in another embodiment with a different flag score algorithm, the storage block with the lowest score might be selected.

Figure 8A:
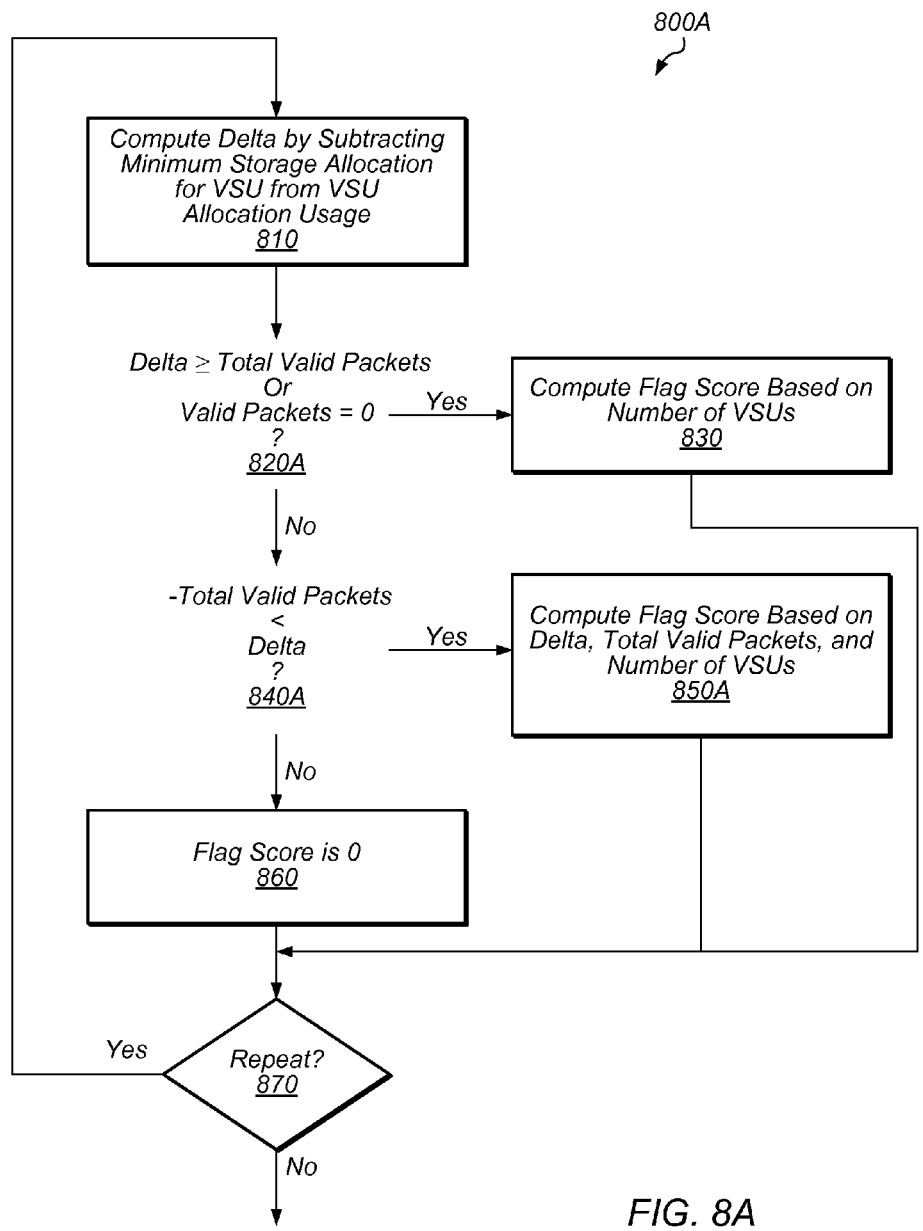
FIGS. 8A and 8B are flow diagrams illustrating embodiments of methods for computing flag scores.

Turning now to FIG. 8A, a flow diagram of a method 800A is depicted. Method 800A is one embodiment of a method for computing flag scores. In some embodiments, method 800A may be performed to implement step 710 in method 700 described above.

In step 810, a value "delta" is computed by subtracting a minimum storage allocation for a VSU from the VSU's allocation usage. For example, in one embodiment, if a VSU has been assigned a QoS level that guarantees a cache implemented by storage 130 will store up a gigabyte and the VSU has two gigabytes of data in the cache, the delta would be one gigabyte—i.e., delta=2 GB=1 GB=1 GB.

In step 820A, it is determined 1) whether delta is greater than or equal to the total number of valid packets in the storage block being evaluated by method 800A and 2) whether the total number of valid packets is equal to zero. If either condition is true, method 800A proceeds to step 830. Otherwise, method 800A proceeds to step 840A.

In step 830, a flag score is computed based on the number of VSUs 310. For example, in one embodiment, the flag score is an integer value divided by the number of VSUs. Thus, for example, if the integer value is 10 and there are three VSUs, the flag score is 10/3. In other embodiments, a flag score may be computed differently in step 830 (as well as in steps 850A and 860).

In step 840A, it is determined whether delta is greater than the total number of valid packets after negation (i.e., being multiplied by negative one). If the condition is true, method 800A proceeds to step 850A. Otherwise, method 800A proceeds to step 860.

In step 850A, a flag score is computed based on delta, the total number of valid packets, and the number of VSUs. In some embodiments, the flag score is set to (N/number of VSUs)+(delta*N)/(number of valid packets*number of VSUs), where N is an integer value—e.g., the value 5 in one embodiment. Thus, for example, if N is 5, delta is 5, the number of valid packets in a storage block is 10, and the number of VSUs is 3, the flag score will be 2.5 (i.e., 5/3+(5*5)/(10*3)).

In step 860, the flag score is set to zero if none of the conditions in steps 820 and 840 are satisfied.

In step 870, a determination of whether to repeat is made. In one embodiment, method 800A may compute a flag score for each VSU having data within a storage block being evaluated by method 800A.

One embodiment of pseudo code for performing method 700 using method 800A is discussed with respect to FIG. 9A.

Figure 8B:
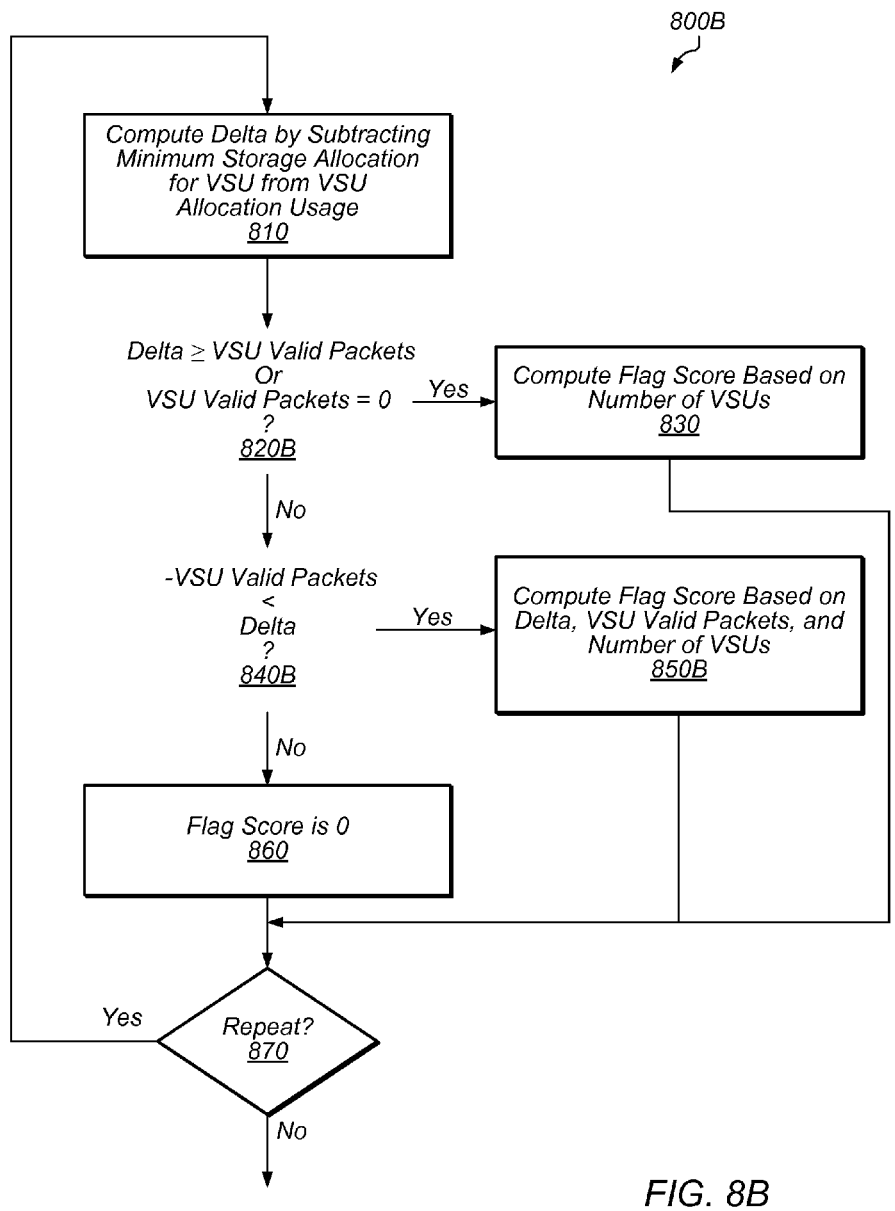

Turning now to FIG. 8B, a flow diagram of a method 800B is depicted. Method 800B is another embodiment of a method for computing flag scores. In some embodiments, method 800B may be performed to implement step 710 in method 700 described above. Method 800B begins in a similar manner as method 800A with performance of step 810. In step 820B, it is determined 1) whether delta is greater than or equal to the number of valid packets in the storage block of the particular VSU being evaluated during this iteration of steps 810-860 and 2) whether the number of valid packets is equal to zero. In other words, method 800B may evaluate the number of valid packets within a storage block on a per VSU basis rather than the total number of valid packets in the storage block as discussed above with respect to method 800A. (In one embodiment, performance of method 800B may include determining the number of valid packets for each VSU having data in the storage block being evaluated; in another embodiment, the valid packets for each VSU is estimated by multiplying the total number of valid packets and the percentage of packets (both valid and invalid) belonging to that VSU.) If either condition is true, step 830 is performed as discussed above. Otherwise, step 840B is performed in which it is determined whether delta is greater than negative one multiplied by the number of valid packets for the VSU being evaluated. If the condition is true, in step 850B, a flag score is computed based on delta, the number of valid packets for the VSU, and the number of VSUs. In some embodiments, the flag score is set to (N/number of VSUs)+(delta*N)/(number of valid packets*number of VSUs), where N is an integer value—e.g., the value 5, in one embodiment. Thus, for example, if N is 5, delta is 5, the number of valid packets for the VSU is 8, and the number of VSUs is 3, the flag score will be 2.71 (i.e., 5/3+(5*5)/(8*3)). If the condition in step 840B is false, step 860 is performed in a similar manner as discussed above with respect to method 800A. Like method 800A, method 800B may compute a flag score for each VSU having data within the storage block being evaluated. One embodiment of pseudo code for performing method 700 using method 800B is discussed with respect to FIG. 9B.

Turning now to FIG. 9A, a diagram illustrating exemplary pseudo code 900A is depicted. Pseudo code 900A is one embodiment of code implementing method 700 and method 800A discussed above. It is noted that, although code 900A (as well as code 900B) refers logical erase blocks (LEBs), code 900A (as well as code 900B) may be applicable to other forms of storage blocks. As shown, pseudo code 900A begins with an initialization portion 910 in which the evaluation's window size is set and the flag sum is set to an initial value. Pseudo code 900A then includes a space adjustment portion 920 and an age adjustment portion 930. Portion 920 computes a utilization value for the storage block by dividing the number of valid packets in the LEB by the total capacity of the LEB expressed in terms of packets. A space efficiency factor is then computed from the utilization value. Portion 930 computes an age factor indicative of the LEB's proximity to the tail in the log structure. Pseudo code 900A then includes a flag portion 940A (corresponding to method 800A) in which flags are computed for LEBs. In portion 950 (corresponding to step 720), a flag sum is computed and adjusted based on the space efficiency factor and the age factor previously computed. Pseudo code 900A concludes with a comparison portion 960 (corresponding to step 740) in which a LEB is selected for reclamation based on compared flag sums.

Turning now to FIG. 9B, a diagram illustrating exemplary pseudo code 900B is depicted. Pseudo code 900B is one embodiment of code implementing method 700 and method 800B discussed above. As shown, pseudo code 900B begins with an initialization portion 910 in which the evaluation's window size is set and the flag sum is set to an initial value. Space efficiency and age factors are computed by portions 920 and 930, respectively. Pseudo code 900B then includes a flag portion 940B (corresponding to method 800B) in which flags are computed for LEBs. In portion 950 (corresponding to step 720), a flag sum is computed and adjusted based on the space efficiency factor and age factor. Pseudo code 900B concludes with a comparison portion 950 (corresponding to step 740) in which a LEB is selected for reclamation based on compared flag sums.

Turning now to FIG. 10A, a table 1000A illustrating an exemplary calculation of flags and flag sums is shown. Table 1000A is computed according to one embodiment of methods 700 and 800A. In this example, three LEBs labeled LEB 1, LEB 2, and LEB 3 are evaluated. The LEBs include data from VSUs labeled VSU 1, VSU 2, and VSU 3. As shown, a delta is computed for each VSU—e.g., VSU 1 has a delta of 5 (i.e., the current usage of 15—the minimum capacity of 10). Flags are then computed for each VSU with respect to each LEB— e.g. the values 2.5, 3.33, and 3.33 were computed for LEB 1 based on formulas discussed above with respect to FIG. 8A. Flag sums are then calculated based on the flags, and a LEB is selected for reclamation. It is noted that this example does not show space efficiency adjustments and age adjustments as discussed with respect to FIG. 9A. In this example, LEB 3 would be based selected first because it has the highest score with a score of 9.99—LEB 3 will also not produce any write amplification as it has no valid packets. LEB 1 would be selected second (assuming no other LEBs were evaluated).

Turning now to FIG. 10B, a table 1000B illustrating another exemplary calculation of flags and flag sums is shown. Table 1000B is computed according to one embodiment of methods 700 and 800B. Similar to table 1000A, a delta is computed for each VSU—e.g., VSU 1 has a delta of 5 (i.e., the current usage of 15—the minimum capacity of 10). Flags are then computed for each VSU with respect to each LEB—e.g. the values 2.71, 3.33, and 3.33 were computed for LEB 1. It is noted that this example does not show space efficiency adjustments and age adjustments as discussed with respect to FIG. 9B. In this instance, flag scores are computed based on the formulas discussed above with respect to FIG. 8B. Flag sums are then calculated based on the flags, and a LEB is selected for reclamation. In this example, LEB 3 would again be selected first because it has the highest score with a score of 9.99. However, LEB 2 would be selected second in this example.

This disclosure has been made with reference to various exemplary embodiments. However, those skilled in the art will recognize that changes and modifications may be made to the exemplary embodiments without departing from the scope of the present disclosure. For example, various operational steps, as well as components for carrying out operational steps, may be implemented in alternate ways depending upon the particular application or in consideration of any number of cost functions associated with the operation of the system (e.g., one or more of the steps may be deleted, modified, or combined with other steps). Therefore, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. As used herein, the terms "comprises," "comprising," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Additionally, as will be appreciated by one of ordinary skill in the art, principles of the present disclosure may be reflected in a computer program product on a machine-readable storage medium having machine-readable program code means embodied in the storage medium. Any tangible, non-transitory machine-readable storage medium may be utilized, including magnetic storage devices (hard disks, floppy disks, and the like), optical storage devices (CD-ROMs, DVDs, Blu-Ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified. These computer program instructions may also be stored in a machine-readable memory that can direct a computer or other programmable data processing apparatus to function in a particular manner, such that the instructions stored in the machine-readable memory produce an article of manufacture, including implementing means that implement the function specified. The computer program instructions may also be loaded onto a computer or other programmable data processing apparatus to cause a series of operational steps to be performed on the computer or other programmable apparatus to produce a computer-implemented process, such that the instructions that execute on the computer or other programmable apparatus provide steps for implementing the functions specified.

While the principles of this disclosure have been shown in various embodiments, many modifications of structure, arrangements, proportions, elements, materials, and components that are particularly adapted for a specific environment and operating requirements may be used without departing from the principles and scope of this disclosure. These and other changes or modifications are intended to be included within the scope of the present disclosure.

What is claimed is:

1. A method comprising:
    operating, by a controller, a solid-state memory array including a plurality of blocks, wherein the solid-state memory array implements a cache for one or more storage devices;
    determining, by a controller, respective operational effects relating to reclaiming ones of the plurality of blocks;
    selecting, by a controller, one of the plurality of blocks as a candidate for reclamation based on the determined operational effects; and
    reclaiming, by a controller, the selected block, the controller comprising one or more of a hardware circuit and a non-transitory computer readable storage medium storing computer-executable program instructions executed by the controller.

2. The method of claim 1, wherein the determined operational effects for a given block indicate a number of write operations to be performed to reclaim the selected block.

3. The method of claim 2, wherein the determining includes determining, for the given block, a score indicative of the number of write operations; and
    wherein the selecting includes selecting a block based on scores determined for ones of the plurality of blocks, wherein the selecting is performed to minimize write amplification resulting from the reclaiming.

4. The method of claim 1, wherein the operational effects are determined based on guaranteed capacities for storage allocations within the solid-state memory array.

5. The method of claim 1, further comprising:
    assigning quality-of-service levels associated with the solid-state memory array;
    wherein the determining includes determining criteria relating to one or more of the quality-of-service levels; and
    wherein the selecting is also based on the determined criteria.

6. The method of claim 5, further comprising:
    maintaining a plurality of virtual storage units having data within the solid-state memory array;
    wherein the determining includes determining a respective amount of valid data within the block for each virtual storage unit;
    wherein the selecting is based on the determined amounts.

7. The method of claim 1, wherein the selecting is based on a number of times that the block has been evaluated as a candidate for reclamation without being selected.

8. An apparatus, comprising:
    a selection module configured to select one of a plurality of storage blocks based on information relating to virtual storage units having data within the plurality of storage blocks, wherein the apparatus is configured to organize the plurality of storage blocks as a log structure; and
    a reclamation module configured to reclaim the selected storage block,
    wherein the selection module and the reclamation module comprise one or more of a hardware circuit and a non-transitory computer readable storage medium storing computer-executable program instructions.

9. The apparatus of claim 8, wherein the information includes minimum storage allocations for the virtual storage units and current storage usages of the storage allocations by the virtual storage units.

10. The apparatus of claim 8, wherein the information includes, for a given one of the plurality of storage blocks, packet information indicating a respective number of packets for each virtual storage unit having data within the storage block.

11. The apparatus of claim 8, wherein the apparatus is configured to:
    store data for a plurality of the virtual storage units within one of the plurality of storage blocks; and
    store data for one of the virtual storage units within ones of the plurality of storage blocks.

12. The apparatus of claim 8, wherein the selection module and the reclamation module comprise the hardware circuit, the hardware circuit comprising a controller circuit configured to perform program operations and erase operations on ones of the plurality of storage blocks.

13. An apparatus, comprising:
- a scoring module configured to calculate respective scores for ones of a plurality of storage blocks in a first storage, wherein at least a portion of the first storage is configured as a cache for a second storage, wherein the scoring module is configured to calculate the respective scores based on respective indications of valid data in the storage blocks; and
- a comparison module configured to identify a storage block as a candidate for reclamation based on the calculated scores,
- wherein the scoring module and the comparison module comprise one or more of a hardware circuit and a non-transitory computer readable storage medium storing computer-executable program instructions.

14. The apparatus of claim 13, wherein the valid data is associated with a plurality of virtual storage units; and
- wherein the scoring module is configured to calculate the respective scores based on criteria relating to one or more quality-of-service levels afforded to ones of the plurality of virtual storage units.

15. The apparatus of claim 13, further comprising:
- an organization module configured to organize the plurality of storage blocks as a log structure having a tail and a head; and
- wherein the scoring module is configured to calculate respective scores for storage blocks within a specified window of storage blocks measured from the tail towards the head.

16. The apparatus of claim 13, further comprising:
- a reclamation module configured to cause an erase operation to be performed on the identified storage block.

17. The apparatus of claim 13, wherein the scoring module and the comparison module comprise the non-transitory computer readable storage medium, the non-transitory computer readable storage medium memories that have computer executable program instructions, wherein the one or more within a computing system that includes the first non-volatile storage.

18. A non-transitory computer readable storage medium having program instructions stored thereon, wherein the program instructions are executable by a computing system to cause the computing system to perform operations comprising:
- identifying ones of a plurality of storage blocks as candidate storage blocks to be reclaimed, wherein the identifying is based on one or more quality-of-service criteria; and
- reclaiming the identified candidate storage blocks.

19. The computer readable storage medium of claim 18, wherein the quality of service criteria include a plurality of allocation-size requirements associated with respective virtual storage units having data within the plurality of storage blocks.

20. The computer readable storage medium of claim 18, wherein the quality of service criteria include a plurality of cache-hit-rate requirements associated with respective virtual storage units having data within the plurality of storage blocks.

21. The computer readable storage medium of claim 18, wherein the program instructions implement a driver-level process within the computing system.

22. A method, comprising:
- organizing, by a controller, a plurality of storage blocks within a first storage as a log structure such that a tail identifies one of the plurality of storage blocks as a current oldest storage block, wherein the first storage is configured as a cache for a second storage;
- selecting, by a controller, one of the plurality of storage blocks, wherein the selected storage block is younger than the current oldest storage block; and
- performing, by a controller, a reclamation of the selected storage block, the controller comprising one or more of a hardware circuit and a non-transitory computer readable storage medium storing computer-executable program instructions executed by the controller.

23. The method of claim 22, wherein the selecting includes determining a score for the storage block based on an amount of valid packets within the storage block that are to be rewritten to the first storage in response to reclaiming the storage block.

24. The method of claim 23, wherein the score is determined based on one or more restrictions imposed by quality-of-service levels associated with applications using the first storage.

25. An apparatus, comprising:
- one or more processors;
- memory having program instructions stored therein, wherein the program instructions are executable by the one or more processors to cause the apparatus to:
- select one of a plurality of erase blocks based on one or more quality of service criteria assigned to applications of a computing system; and
- cause an erasure of the selected erase block.

* * * * *